(12) United States Patent
Kojima

(10) Patent No.: US 9,647,747 B2
(45) Date of Patent: May 9, 2017

(54) COMMUNICATION SYSTEM, TRANSMITTING DEVICE, RELAY DEVICE, AND COMMUNICATION METHOD

(71) Applicant: FUJITSU LIMITED, Kawasaki-shi, Kanagawa (JP)

(72) Inventor: Yuji Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 178 days.

(21) Appl. No.: 14/531,381

(22) Filed: Nov. 3, 2014

(65) Prior Publication Data
US 2015/0131449 A1 May 14, 2015

(30) Foreign Application Priority Data

Nov. 12, 2013 (JP) ................................. 2013-234453

(51) Int. Cl.
*H04B 7/155* (2006.01)
*H04W 28/02* (2009.01)
(Continued)

(52) U.S. Cl.
CPC ......... *H04B 7/15521* (2013.01); *H04L 47/40* (2013.01); *H04W 28/0273* (2013.01); *H04B 7/15592* (2013.01); *H04L 45/245* (2013.01)

(58) Field of Classification Search
CPC ....................... H04B 7/15521; H04W 28/0273
See application file for complete search history.

(56) References Cited

U.S. PATENT DOCUMENTS 9,203,755 B1 *  12/2015  Wong ................... H04L 43/0829
2006/0045016 A1 *  3/2006  Dawdy ..................... H04L 47/10
                                                                          370/235
(Continued)

FOREIGN PATENT DOCUMENTS

JP          2012-151772            8/2012

OTHER PUBLICATIONS

"Evaluation of LTE-WLAN Link Aggregation provided by LTE Femto cell base station", 2013 IEICE, pp. 667, B-17-23, Mar. 2013. Translation of left column, line 10 to line 44.
(Continued)

*Primary Examiner* — Sulaiman Nooristany
(74) *Attorney, Agent, or Firm* — Staas Halsey LLP

(57) ABSTRACT

A communication system includes: a server configured to transmit a series of data packets through a relay device and a transmitting device to receiving device; the receiving device configured to transmit a plurality of acknowledgement packets for the data packets; the transmitting device configured to provide, when executing link aggregation on a downlink flow including the data packets, a notification that represents that the downlink flow is subjected to the link aggregation; and the relay device configured to: execute a process of concealing a specific acknowledgement packet that is among the plurality of acknowledgement packets and included in an uplink flow corresponding to the downlink flow subjected to the link aggregation and represents that an order in which the data packets arrive at the receiving device is reversed, when receiving the notification from the transmitting device, and transmit the other acknowledgement packets remaining after the concealment process to the server.

8 Claims, 28 Drawing Sheets

(51) Int. Cl.
*H04L 12/893* (2013.01)
*H04L 12/709* (2013.01)

(56) References Cited

U.S. PATENT DOCUMENTS

| | | | |
|---|---|---|---|
| 2012/0188873 A1 | 7/2012 | Nakatsugawa | |
| 2013/0021968 A1* | 1/2013 | Reznik | H04W 36/026 370/328 |
| 2014/0369329 A1* | 12/2014 | Lee | H04W 28/06 370/338 |

OTHER PUBLICATIONS

"Duplicate ACK Filtering for Link Aggregation on Heterogeneous Networks", 2013 IEICE, pp. 59, B-6-59, Sep. 2013. Translation of left column, line 23 to right column, line 3.

* cited by examiner

FIG. 4

| No. | IP HEADER | | TCP HEADER | |
|---|---|---|---|---|
| | DESTINATION IP ADDRESS | SOURCE IP ADDRESS | DESTINATION PORT ADDRESS | SOURCE PORT NUMBER |
| 1 | COMMUNICATION TERMINAL #1 | SERVER #1 | n2 | n1 |
| 2 | COMMUNICATION TERMINAL #1 | SERVER #2 | n4 | n3 |
| 3 | COMMUNICATION TERMINAL #2 | SERVER #1 | n2 | n1 |
| 4 | COMMUNICATION TERMINAL #2 | SERVER #2 | n4 | n3 |

FIG. 14

| No. | IP HEADER | | TCP HEADER | | POINTER REPRESENTING COMMUNICATION LINK TABLE |
|---|---|---|---|---|---|
| | DESTINATION IP ADDRESS | SOURCE IP ADDRESS | DESTINATION PORT NUMBER | SOURCE PORT NUMBER | |
| 1 | COMMUNICATION TERMINAL #1 | SERVER #1 | n2 | n1 | p1 |
| 2 | COMMUNICATION TERMINAL #1 | SERVER #2 | n4 | n3 | p2 |
| 3 | COMMUNICATION TERMINAL #2 | SERVER #1 | n2 | n1 | p3 |
| 4 | COMMUNICATION TERMINAL #2 | SERVER #2 | n4 | n3 | p4 |

FIG. 15

| p1 ||
|---|---|
| SN | COMMUNICATION LINK |
| 1 | LTE |
| 2 | WiFi |
| 3 | WiFi |

FIG. 23

| No. | FEMTO GW | LOAD STATE |
|---|---|---|
| 1 | FEMTO GW#1 | LOW |
| 2 | FEMTO GW#2 | HIGH |
| 3 | FEMTO GW#3 | HIGH |

COMMUNICATION SYSTEM, TRANSMITTING DEVICE, RELAY DEVICE, AND COMMUNICATION METHOD

CROSS-REFERENCE TO RELATED APPLICATION

This application is based upon and claims the benefit of priority of the prior Japanese Patent Application No. 2013-234453 filed on Nov. 12, 2013, the entire contents of which are incorporated herein by reference.

FIELD

The embodiments discussed herein are related to a communication system, a transmitting device, a relay device, and a communication method.

BACKGROUND

In a conventional cellular communication system, multiple "macrocells" that each have a communication region with a radius of several hundred meters to several kilometers are formed and communication is executed. Since a communication region of each macrocell is large, the strength of a radio wave is low and the quality of communication is reduced in places such as a boundary region between macrocells, an indoor place, and a basement. Thus, recently, a "femto cell base station" (femto base station), a small base station that forms a "femto cell" with a radius of approximately 10 meters, has been installed in each of the places so as to inhibit a reduction in the quality of communication. Communication is executed using Wireless Fidelity (WiFi) in femto cells. Thus, the femto base station has a WiFi interface.

Recently, instead of 3G, Long Term Evolution (LTE) that enables a higher communication rate than 3G tends to be widely used as a communication scheme that enables communication terminals such as smartphones to be connected to each other in macrocells. Thus, it is expected that a femto base station that has an LTE interface will be installed in each of the aforementioned places in the future. It is, therefore, expected that if a communication terminal that has wireless interfaces for both LTE and WiFi is positioned in any of the aforementioned places, the communication terminal will be able to be connected to both LTE and WiFi simultaneously. In this case, the femto base station may improve the throughput of a certain traffic flow (hereinafter merely referred to as "flow" in some cases) by executing link aggregation (hereinafter referred to as "LA" in some cases) on the flow so as to communicate with the communication terminal using a communication link for LTE and a communication link for WiFi simultaneously. Especially, it is important that the throughput of a flow in the transmission control protocol (TCP) be improved for the LA. The TCP is used by many applications. Hereinafter, the communication link for LTE is referred to as an "LTE link" in some cases, and the communication link for WiFi is referred to as a "WiFi link" in some cases.

In the LA executed on a certain flow in the TCP, the femto base station uses a predetermined distribution algorithm for a flow in a "downlink" (hereinafter referred to as "DL" in some cases) directed from a server to the communication terminal so as to distribute data packets included in the DL flow to the LTE link and the WiFi link on a packet basis. In this case, the femto base station measures the utilization (for example, the utilization of a physical resource block (PRB) of the LTE link) of a wireless line and appropriately distributes the data packets at an appropriate time using the result of the measurement as a parameter to be input to the distribution algorithm, for example.

SUMMARY

According to an aspect of the invention, a communication system comprising: a server configured to transmit a series of data packets through a relay device and a transmitting device to receiving device; the receiving device configured to transmit a plurality of acknowledgement packets for the data packets through the transmitting device and the relay device to the server; the transmitting device configured to provide to the relay device, when executing link aggregation on a downlink flow including the data packets simultaneously using a plurality of communication links between the transmitting device and the receiving device, a notification that represents that the downlink flow is subjected to the link aggregation; and the relay device configured to: execute a process of concealing a specific acknowledgement packet that is among the plurality of acknowledgement packets and included in an uplink flow corresponding to the downlink flow subjected to the link aggregation and represents that an order in which the data packets arrive at the receiving device is reversed, when receiving the notification from the transmitting device, and transmit the other acknowledgement packets remaining after the concealment process to the server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a flow table according to the first embodiment;

FIG. 14 is a diagram illustrating an example of a flow table according to the third embodiment;

FIG. 15 is a diagram illustrating an example of a communication link table according to the third embodiment;

FIG. 23 is a diagram illustrating an example of a load state table according to the fourth embodiment;

DESCRIPTION OF EMBODIMENTS

Figure 1:
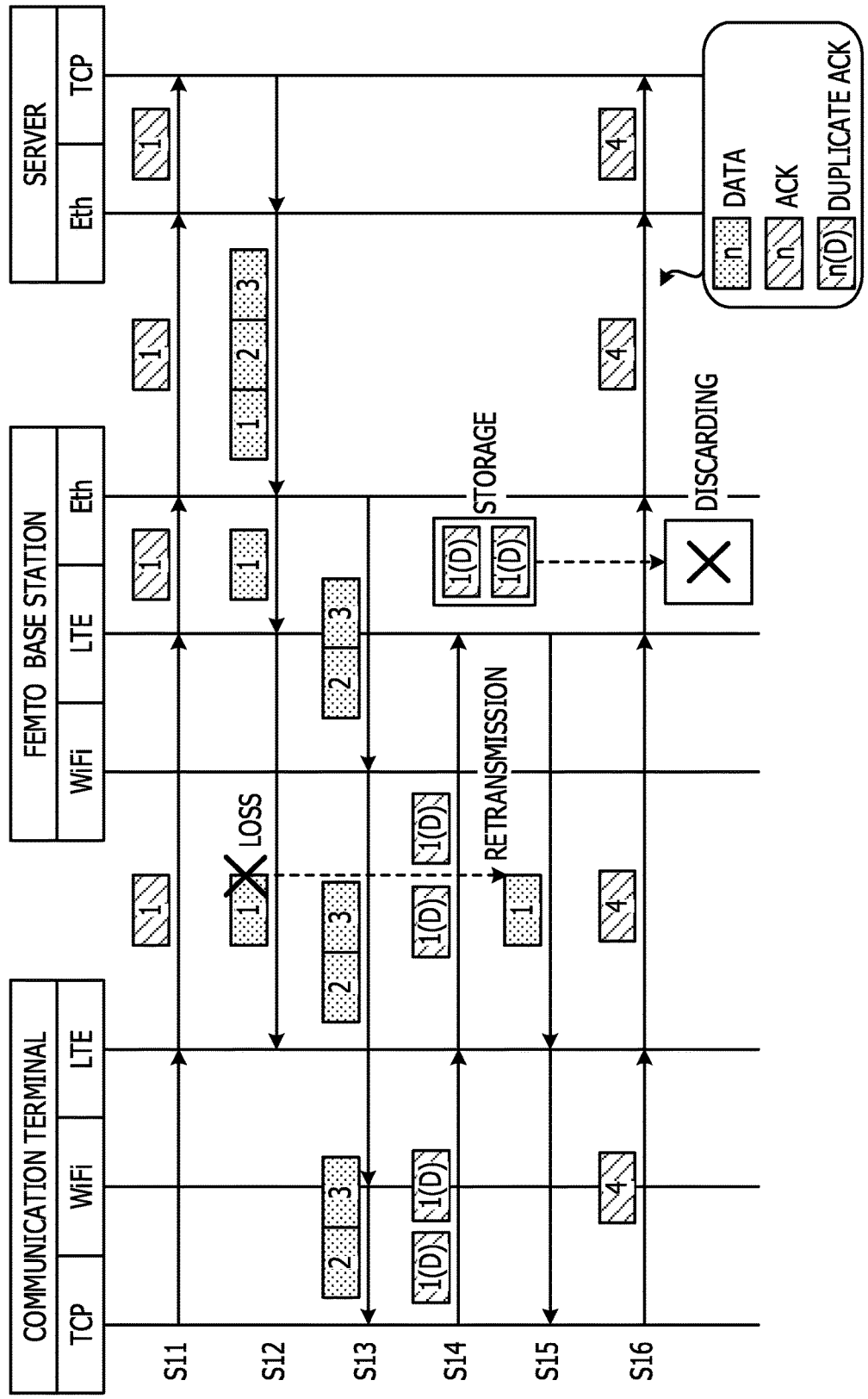
FIG. 1 is a diagram illustrating an example of a process sequence of a communication system.

Hereinafter, embodiments of the communication system disclosed herein, the transmitting device disclosed herein, the relay device disclosed herein, and the communication method disclosed herein are described with reference to the accompanying drawings. The communication system disclosed herein, the transmitting device disclosed herein, the relay device disclosed herein, and the communication method disclosed herein are not limited by the embodiments. In the embodiments, configurations that have the same function are represented by the same reference numeral, steps of executing the same process are represented by the same reference symbol, and duplicated descriptions are omitted.

While inventing the present embodiments, observations were made regarding a related art. Such observations include the following, for example.

In the related art, when receiving a data packet, a communication terminal causes a flow of an uplink (hereinafter referred to as UL in some cases) directed from the communication terminal to a server to include an "acknowledgement packet" (hereinafter referred to as "ACK packet" in some cases) for the received data packet and transmits the UL flow to the server. Since the communication terminal receives data packets distributed to an LTE link and a WiFi link on a packet basis during the execution of LA, an order in which the data packets arrive at the communication terminal may be reversed with respect to an order in which a femto base station transmits the data packets, depending on delay times in the wireless links. For example, it is assumed that the femto base station that currently executes the LA first transmits a first data packet using the LTE link and next transmits a second data packet using the WiFi link and that a delay of the first data packet transmitted using the LTE link is larger than a delay of the second data packet transmitted using the WiFi link. In this case, the second data packet transmitted using the WiFi link may arrive at the communication terminal before the first data packet transmitted using the LTE link arrives at the communication terminal, or the order in which the data packets arrive at the communication terminal may be reversed with respect to the order in which the data packets are transmitted. If the communication terminal detects the reversed order in which the data packets arrive at the communication terminal, the communication terminal transmits an ACK packet to the server in accordance with a predetermined transmission pattern. The ACK packet is referred to as a duplicate acknowledgement (duplicate ACK). Specifically, the duplicate ACK is the ACK packet that represents that the order in which the data packets arrive at the communication terminal is reversed. When receiving a predetermined number of duplicate ACKs or more, the server determines a loss of a packet within a path extending from the server to the communication terminal, retransmits the packet, and thereby reduces a data packet transmission rate. Thus, if the reversed order is detected by the communication terminal, the throughput of a DL flow is reduced. Thus, in order to conceal the reversed order detected by the communication terminal from the server and inhibit the reduction in the throughput of the DL flow, the femto base station may execute a "concealment process" on the duplicate ACK. One of concealment processes is a technique that is referred to as "duplicate ACK filtering". An example of the duplicate ACK filtering is described below.

FIG. 1 is a diagram illustrating an example of a process sequence of a communication system. In FIG. 1, "TCP" represents a process to be executed by a processor in accordance with the TCP. In FIG. 1, "LTE" represents LTE interfaces, "WiFi" represents WiFi interfaces, and "Eth" represents Ethernet (registered trademark) interfaces.

Referring to FIG. 1, when a communication terminal uses the LTE link to transmit an ACK packet n=1 (in step S11), a server transmits a series of data packets n=1, 2, and 3 to a femto base station in response to the ACK packet (in step S12). The femto base station that executes the LA distributes the data packet n=1 to the LTE link, distributes the data packets n=2 and 3 to the WiFi link, and thereby transmits the data packets to the communication terminal. It is assumed that the data packet n=1 is lost within the LTE link. Thus, the data packets n=2 and 3 arrive at the communication terminal before arrival of the data packet n=1 (in steps S12 and S13). Specifically, the communication terminal detects a reversed order in which the data packets arrive at the communication terminal. Note that "n" represents sequence numbers (SN) of the data packets.

The communication terminal that detects the reserved order uses the LTE link to transmit duplicate ACKs with a number n=1 that is the same as the sequence number of the data packet delayed in arrival (in step S14). The "duplicate ACKs" are a plurality of ACK packets with the same sequence number.

The femto base station receives the duplicate ACKs n=1 and stores the duplicate ACKs n=1 in a buffer (in step S14).

The LTE interface of the femto base station is defined by an LTE communication scheme. It is clarified by retransmission control for LTE communication that the data packet n=1 is lost within the LTE link. Thus, the LTE interface of the femto base station uses the LTE link to retransmit the data packet n=1 in accordance with specifications of the LTE communication scheme (in step S15). It is assumed that the retransmitted data packet n=1 arrives at the communication terminal.

Since the data packets n=1 to 3 arrive at the communication terminal at the time of step S15, the communication terminal uses the LTE link to transmit an ACK packet n=4 in order to notify the femto base station that the data packets n=1 to 3 have arrived at the communication terminal. The femto base station receives the ACK packet n=4, determines that the data packets n=1 to 3 have arrived at the communication terminal, discards the duplicate ACKs stored in the buffer, and transmits the ACK packet n=4 to the server (in step S16). Specifically, the duplicate ACKs are filtered by the femto base station and concealed from the server. Since the reversed order detected by the communication terminal is concealed from the server, the reduction in the throughput of the DL flow may be inhibited.

The aforementioned concealment process causes a large process load of a central processing unit (CPU). It is preferable that the femto base station be small and inexpensive. As the performance of the CPU is increased, the femto base station is larger and more expensive. Thus, the increase in the performance of the CPU of the femto base station for the execution of the concealment process is preferably avoided. In addition, if the femto base station has a low-performance CPU and tries to execute the aforementioned concealment process and the utilization of the CPU is high due to another process or the like, the femto base station does not execute the concealment process and causes a reduction in the throughput of the DL flow as a result of the inexecution of the concealment process.

In the related art, the communication terminal has been considered to have a function of sorting, in the original order, data packets that have arrived in the reversed order. However, if the communication terminal has this function, a process load of the communication terminal increases, and this function may not be installed with user authority in a communication terminal having installed therein an operating system for smartphones, such as Android or the like.

Accordingly, techniques disclosed herein have been devised in consideration of the aforementioned facts, and it is an object of the techniques disclosed herein to provide a communication system, a transmitting device, a relay device, and a communication method, which may suppress an increase in CPU utilization of a base station and inhibit a reduction in throughput.

First Embodiment

Example of Configuration of Communication System

Figure 2:
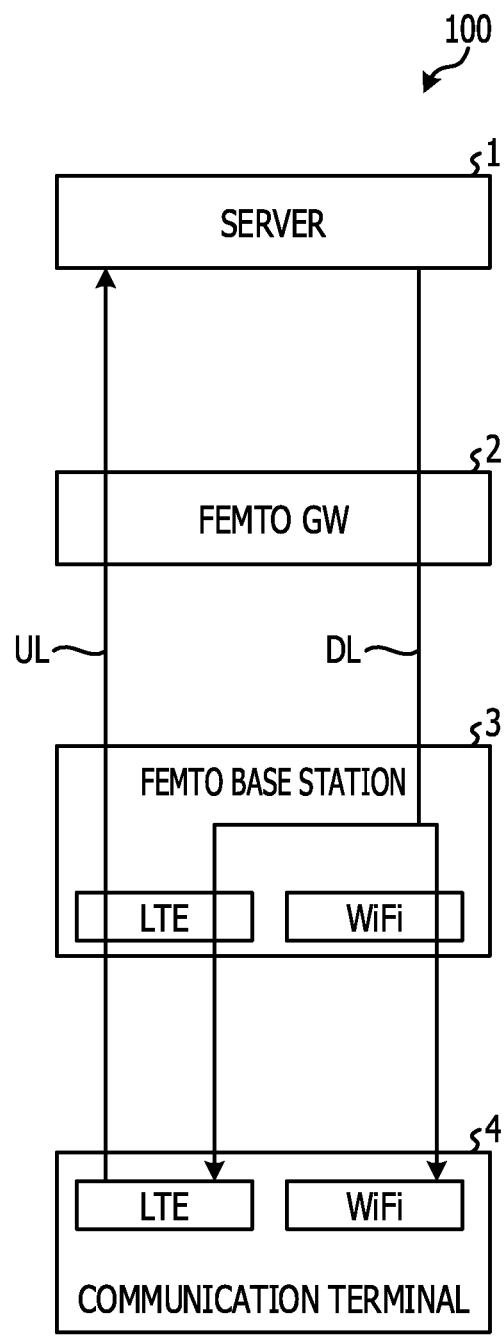
FIG. 2 is a diagram illustrating an example of a configuration of a communication system according to a first embodiment.

FIG. 2 is a diagram illustrating an example of a configuration of a communication system according to a first embodiment. A communication system 100 illustrated in FIG. 2 includes a server 1, a femto gateway (GW) 2, a femto base station 3, and a communication terminal 4.

First, a DL is described below.

A series of data packets included in a DL flow are transmitted from the server 1 through the femto GW 2 and the femto base station 3 to the communication terminal 4. The server 1, the femto GW 2, and the femto base station 3 are connected by a wired link. The data packets transmitted from the server 1 are relayed by the femto GW 2 and arrive at the femto base station 3 through the wired link. Thus, the femto GW 2 corresponds to a "relay device" configured to relay the data packets of the DL flow.

The femto base station 3 and the communication terminal 4 are connected to each other by wireless links. The femto base station 3 executes LA on the DL flow so as to simultaneously use an LTE link and a WiFi link to transmit the data packets to the communication terminal 4. During the time when the femto base station 3 executes the LA, the femto base station 3 distributes the series of data packets received from the femto GW 2 to the LTE link and the WiFi link on a data packet basis and transmits the data packets to the communication terminal 4. For example, if the utilization (for example, the utilization of a PRB of the LTE link) of the LTE link is equal to or higher than a threshold, the femto base station 3 executes the LA. In addition, as the utilization of the LTE link that is equal to or higher than the threshold becomes higher, the femto base station 3 increases the number of data packets to be distributed to the WiFi link. On the other hand, during the time when the femto base station 3 does not execute the LA, the femto base station 3 uses only the LTE link to transmit the series of data packets received from the femto GW 2 to the communication terminal 4. Thus, the femto base station 3 corresponds to a "transmitting device" configured to use at least one of the wireless links to transmit the data packets of the DL flow to the communication terminal 4.

The communication terminal 4 may simultaneously use the LTE link and the WiFi link for the DL flow to receive the data packets from the femto base station 3. During the time when the femto base station 3 executes the LA, the communication terminal 4 simultaneously uses the LTE link and the WiFi link to receive the data packets from the femto base station 3. On the other hand, during the time when the femto base station 3 does not execute the LA, the communication terminal 4 uses only the LTE link to receive the data packets from the femto base station 3. Thus, the communication terminal 4 corresponds to a "receiving device" configured to use at least one of the wireless links to receive the data packets of the DL flow from the femto base station 3. During the time when the femto base station 3 executes the LA, an order in which the data packets are received by the communication terminal 4 using only the LTE link may be reversed with respect to an order in which the data packets are received by the communication terminal 4 using the WiFi link.

Next, an UL is described.

ACK packets that are included in an UL flow corresponding to the DL flow including the series of data packets and are provided for the data packets included in the DL flow are transmitted from the communication terminal 4 through the femto base station 3 and the femto GW 2 to the server 1.

The communication terminal 4 forms the ACK packets for the received data packets and uses the LTE link to transmit the formed ACK packets to the femto base station 3. When the communication terminal 4 detects the reversed order, the communication terminal 4 transmits a duplicate ACK. Thus, the duplicate ACK may be included in the multiple ACK packets to be transmitted from the communication terminal 4 to the femto base station 3.

The femto base station 3 transmits the ACK packets received from the communication terminal 4 to the femto GW 2. When the femto base station 3 executes the LA on the DL flow, the femto base station 3 transmits the ACK packets to the femto GW 2 and transmits, to the femto GW 2, a notification (hereinafter referred to as LA notification in some cases) that represents that the DL flow is subjected to the LA. When the DL flow is not subjected to the LA, the femto base station 3 does not provide the LA notification to the femto GW 2. Thus, the femto GW 2 may determine, based on the presence or absence of the LA notification, whether or not the femto base station 3 currently executes the LA.

The femto GW 2 receives the ACK packets from the femto base station 3. When receiving the LA notification from the femto base station 3, the femto GW 2 conceals the reversed order detected by the communication terminal 4 from the server 1. Specifically, when receiving the LA notification from the femto base station 3, the femto GW 2 executes a process of concealing the duplicate ACK among the ACK packets included in the UL flow and transmits the other ACK packets remaining after the concealment process to the server 1. If the femto GW 2 does not receive the LA notification from the femto base station 3, the femto GW 2 transmits the ACK packets received from the femto base station 3 to the server 1 without concealing the ACK packets received from the femto base station 3. Thus, if the femto GW 2 does not receive the LA notification from the femto base station 3, the duplicate ACK may be included in the ACK packets transmitted from the femto base station 3 to the server 1.

When receiving the duplicate ACK from the femto GW 2, the server 1 retransmits, to the communication terminal 4, a data packet with a sequence number that is the same as the duplicate ACK.

The femto base station 3 distributes the data packets of the DL flow subjected to the LA based on the utilization of the LTE link in the aforementioned manner. The utilization of the LTE link momentarily changes based on the amounts of the data packets and the like. Thus, in order to distribute the data packets of the DL flow subjected to the LA based on the momentarily changing utilization of the wireless line, it is preferable that a delay of a series of processes from the acquisition of the utilization of the wireless line to the distribution of the data packets be as small as possible.

Since the aforementioned concealment process is executed without the acquisition of a momentarily changing state of the wireless line such as the utilization of the wireless line, a delay of the concealment process is accepted.

According to the techniques disclosed herein, the distribution process that may be executed by a base station during the execution of the LA is executed by the femto base station 3 and the process of concealing a reversed order is executed by the femto GW 2.

Example of Configuration of Femto Base Station

Figure 3:
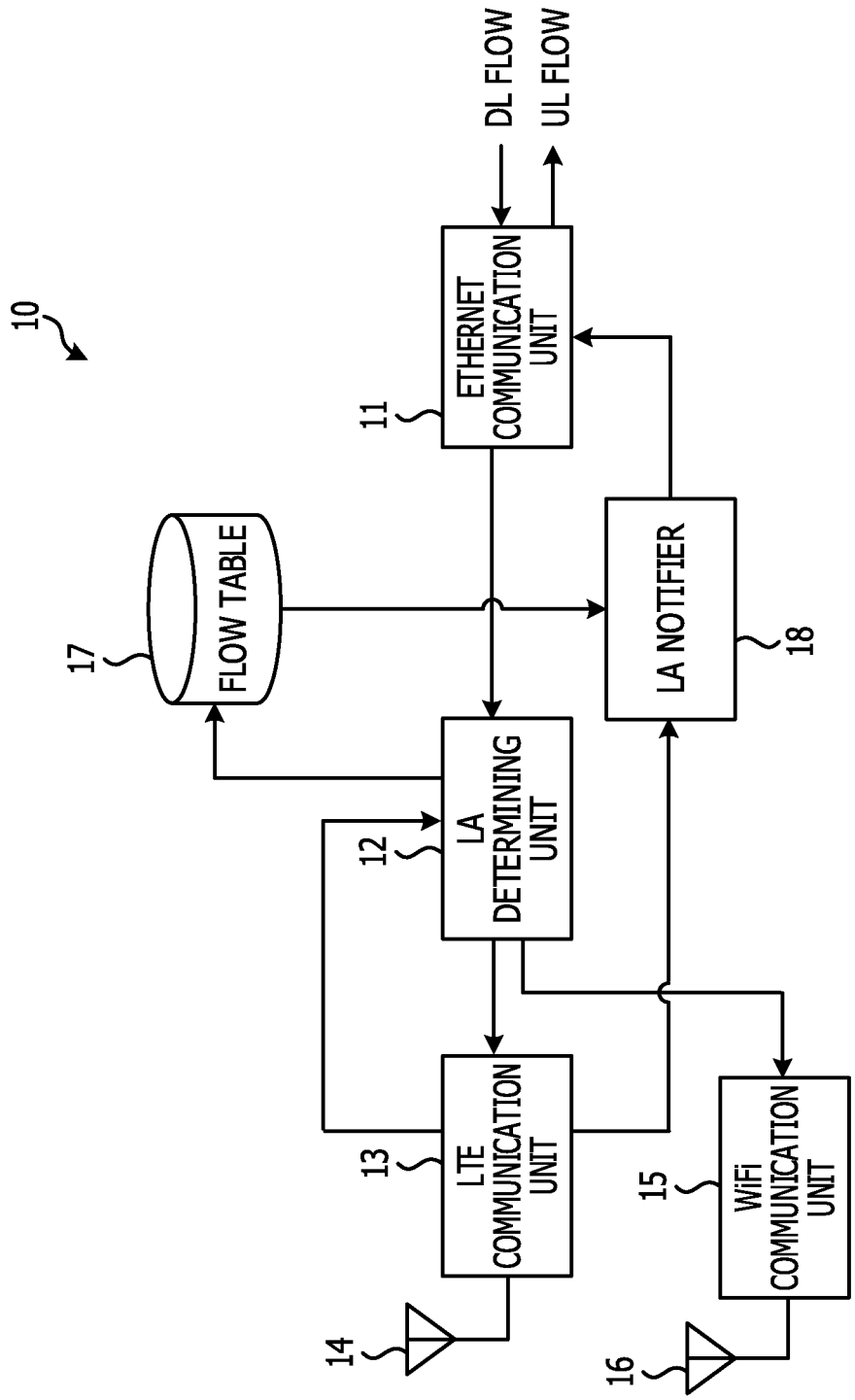
FIG. 3 is a block diagram illustrating an example of a femto base station according to the first embodiment.

FIG. 3 is a functional block diagram illustrating an example of the femto base station according to the first embodiment. A femto base station 10 illustrated in FIG. 3 corresponds to the femto base station 3 illustrated in FIG. 2. The femto base station 10 includes an Ethernet communication unit 11, an LA determining unit 12, an LTE communication unit 13, an LTE antenna 14, a WiFi communication unit 15, a WiFi antenna 16, a flow table 17, and an LA notifier 18.

The Ethernet communication unit 11 communicates with the femto GW 2 in accordance with an Ethernet scheme, receives the DL flow from the femto GW 2, outputs the DL flow to the LA determining unit 12, and transmits the UL flow input from the LA notifier 18 to the femto GW 2. The DL flow includes the data packets, and the UP flow includes the ACK packets.

The LA determining unit 12 determines whether or not the LA is to be executed using the LTE link and the WiFi link simultaneously on the DL flow. The LA determining unit 12 periodically acquires the utilization of the LTE link from the LTE communication unit 13. If the utilization of the LTE link is equal to or higher than the threshold, the LA determining unit 12 determines that the LA is to be executed. If the utilization of the LTE link is lower than the threshold, the LA determining unit 12 determines that the LA is not to be executed. If the LA determining unit 12 determines that the LA is not to be executed, the LA determining unit 12 outputs the DL flow input from the Ethernet communication unit 11 to the LTE communication unit 13 and does not output the DL flow to the WiFi communication unit 15. If the LA determining unit 12 determines that the LA is to be executed, the LA determining unit 12 distributes the data packets included in the DL flow received from the Ethernet communication unit 11 to the LTE communication unit 13 and the WiFi communication unit 15 based on the utilization of the LTE link and outputs the DL flow. During the time when the LA is executed, as the utilization of the LTE link becomes higher, the LA determining unit 12 increases the number of data packets to be distributed to the WiFi communication unit 15. In addition, the LA determining unit 12 registers, in the flow table 17, information that represents the DL flow targeted for the LA or the DL flow subjected to the LA.

FIG. 4 is a diagram illustrating an example of the flow table according to the first embodiment. DL flows that are different from each other are distinguished and uniquely identified by Internet Protocol (IP) addresses of sources of the DL flows, port numbers of the sources, IP addresses of destinations of the DL flows, and port numbers of the destinations. The destination IP addresses and the source IP addresses are stored in and represented by IP headers of data packets, while the destination port numbers and the source port numbers are stored in and represented by TCP headers of the data packets. The LA determining unit 12 acquires a destination IP address, a source IP address, a destination port number, and a source port number from the headers of the data packets included in the DL flow subjected to the LA, associates the acquired IP addresses and the acquired port numbers with each other, and registers the acquired IP addresses and the acquired port numbers. For example, as illustrated in FIG. 4, if a source of the DL flow subjected to the LA is a port n1 of a server #1 and a destination of the DL flow subjected to the LA is a port n2 of a communication terminal #1, a destination IP address that is an IP address of the communication terminal #1, a source IP address that is an IP address of the server #1, a destination port number n2, and a source port number n1 are associated with each other and registered as a "DL flow 1".

The LTE communication unit 13 uses the LTE link to communicate with the communication terminal 4. The LTE communication unit 13 transmits the DL flow input from the LA determining unit 12 to the communication terminal 4 through the antenna 14 in accordance with an LTE scheme. In addition, the LTE communication unit 13 receives the UL flow transmitted from the communication terminal 4 using the LTE link through the antenna 14 and outputs the received UL flow to the LA notifier 18. In addition, the LTE communication unit 13 periodically measures the utilization of the LTE link and outputs results of the measurement to the LA determining unit 12.

The WiFi communication unit 15 uses the WiFi link to communicate with the communication terminal 4. The WiFi communication unit 15 transmits the DL flow input from the LA determining unit 12 to the communication terminal 4 through the antenna 16 in accordance with a WiFi scheme.

When the LA is executed on the DL flow, the LA notifier 18 forms the LA notification and outputs the LA notification to the Ethernet communication unit 11. The LA notification is included in the UL flow to be output from the LA notifier 18 and input to the Ethernet communication unit 11.

Specifically, first, the LA notifier 18 searches the flow table 17 and determines whether or not the DL flow that corresponds to the UL flow input from the LTE communication unit 12 is currently subjected to the LA in the following manner. The LA notifier 18 acquires a destination IP address and a source IP address from IP headers of the ACK packets included in the UL flow and acquires a destination port number and a source port number from TCP headers of the ACK packets included in the UL flow. A destination of the DL flow is the same as a source of the UL flow corresponding to the DL flow, while a source of the DL flow is the same as a destination of the UL flow. For example, if the source of the DL flow is the port n1 of the server #1 and the destination of the DL flow is the port n2 of the communication terminal #1, the source of the UL flow corresponding to the DL flow is the port n2 of the communication terminal #1, and the destination of the UL flow corresponding to the DL flow is the port n1 of the server #1. Thus, "the UL flow that corresponds to the DL flow" is the UL flow of which the source is the same as the destination of the DL flow and of which the destination is the same as the source of the DL flow. The "DL flow that corresponds to the UL flow" is the DL flow of which the source is the same as the destination of the UL flow and of which the destination is the same as the source of the UL flow. The LA notifier 18 searches the flow table 17 while using a "destination IP address" of an ACK packet as a key for a "source IP address" of the flow table 17, a "source IP address" of the ACK packet as a key for a "destination IP address" of the flow table 17, a "destination port number" of the ACK packet as a key for a "source port number" of the flow table 17, and a "source port number" of the ACK packet as a key for a "destination port number" of the flow table 17. For example, when the ACK packet of which a source is the port n2 of the communication terminal #1 and of which a destination is the port n1 of the server #1 is input to the LA notifier 18, an entry of the "DL flow 1" is hit as a result of the search of the flow table 17 illustrated in FIG. 4. If the entry is hit as a result of the search, the LA notifier 18 determines that the DL flow that corresponds to the input UL flow is currently subjected to the LA. If any entry is not hit, the LA notifier 18 determines that the DL flow that corresponds to the input UL flow is not currently subjected to the LA.

Figure 5:
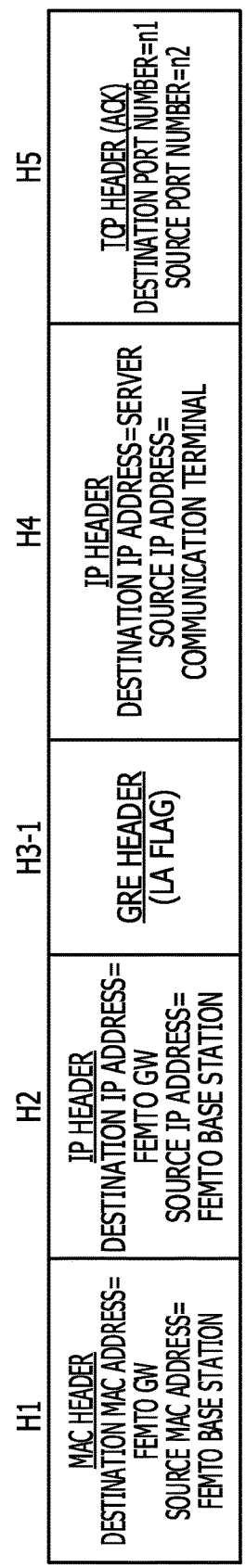
FIG. 5 is a diagram illustrating an example of an ACK packet according to the first embodiment.

In addition, the LA notifier 18 forms the LA notification in the following manner, for example. FIG. 5 is a diagram illustrating an example of an ACK packet according to the first embodiment.

An ACK packet that is input to the LA notifier 18 from the LTE communication unit 13 has an IP header H4 and a TCP header H5. A type of the TCP header H5 is an "ACK". The LA notifier 18 adds a generic routing encapsulation (GRE) header H3-1 to the IP header H4 and TCP header H5 of the ACK packet of the UL flow corresponding to the DL flow subjected to the LA and encapsulates the IP header H4 and the TCP header H5 with the GRE header H3-1. Specifically, the ACK packet is encapsulated by the addition of the GRE header H3-1. The GRE header H3-1 is added to the ACK packet of the UL flow corresponding to the DL flow subjected to the LA as a flag (hereinafter referred to as "LA flag" in some cases) representing that the corresponding DL flow is currently subjected to the LA. Specifically, the LA notifier 18 uses the GRE header H3-1 as the LA flag and forms the LA notification based on the addition of the GRE header H3-1. Then, the LA notifier 18 adds a MAC header H1 and an IP header H2 to the IP and TCP headers 4 and 5 encapsulated by the GRE header H3-1 so as to form the ACK packet and outputs the formed ACK packet to the Ethernet communication unit 11.

On the other hand, the LA notifier 18 does not add the GRE header H3-1 to the ACK packet of the UL flow corresponding to the DL flow if the DL flow is not subjected to the LA, and the LA notifier 18 adds a MAC header H1 and an IP header H2 directly to the IP header H4 and TCP header H5 of the ACK packet so as to form the ACK packet and outputs the formed ACK packet to the Ethernet communication unit 11.

Example of Configuration of Femto GW

Figure 6:
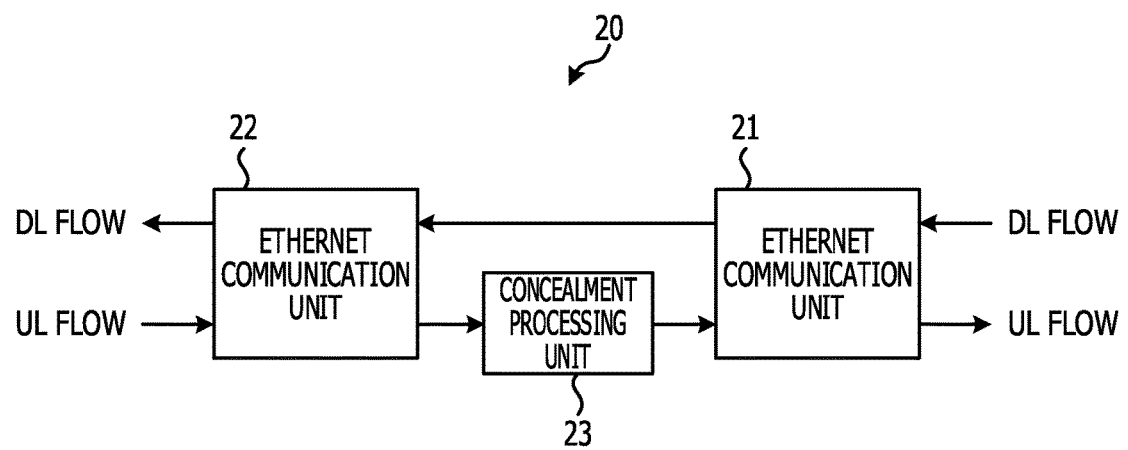
FIG. 6 is a functional block diagram illustrating an example of a femto GW according to the first embodiment.

FIG. 6 is a functional block diagram illustrating an example of the femto GW according to the first embodiment. A femto GW 20 illustrated in FIG. 6 corresponds to the femto GW 2 illustrated in FIG. 2. The femto GW 20 includes Ethernet communication units 21 and 22 and a concealment processing unit 23.

The Ethernet communication unit 21 communicates with the server 1 in accordance with the Ethernet scheme, receives the DL flow from the server 1, outputs the DL flow to the Ethernet communication unit 22, and transmits the UL flow received from the concealment processing unit 23 to the server 1.

The Ethernet communication unit 22 communicates with the femto base station 10 in accordance with the Ethernet scheme, transmits the DL flow received from the Ethernet communication unit 21 to the base station 10, receives the UL flow from the femto base station 10, and outputs the received UL flow to the concealment processing unit 23.

If the UL flow received from the Ethernet communication unit 22 includes the LA notification, the concealment processing unit 23 conceals the reversed order detected by the communication terminal 4 from the server 1. Specifically, when the Ethernet communication unit 22 receives the LA notification from the femto base station 10, the concealment processing unit 23 executes the process of concealing the duplicate ACK among the ACK packets included in the UL flow and outputs the other ACK packets remaining after the concealment process to the Ethernet communication unit 21. On the other hand, if the UL flow received from the Ethernet communication unit 22 does not include the LA notification, the concealment processing unit 23 does not conceal the ACK packets received from the Ethernet communication unit 22 and outputs the ACK packets to the Ethernet communication unit 21.

Process Sequence of Communication System

Figure 7:
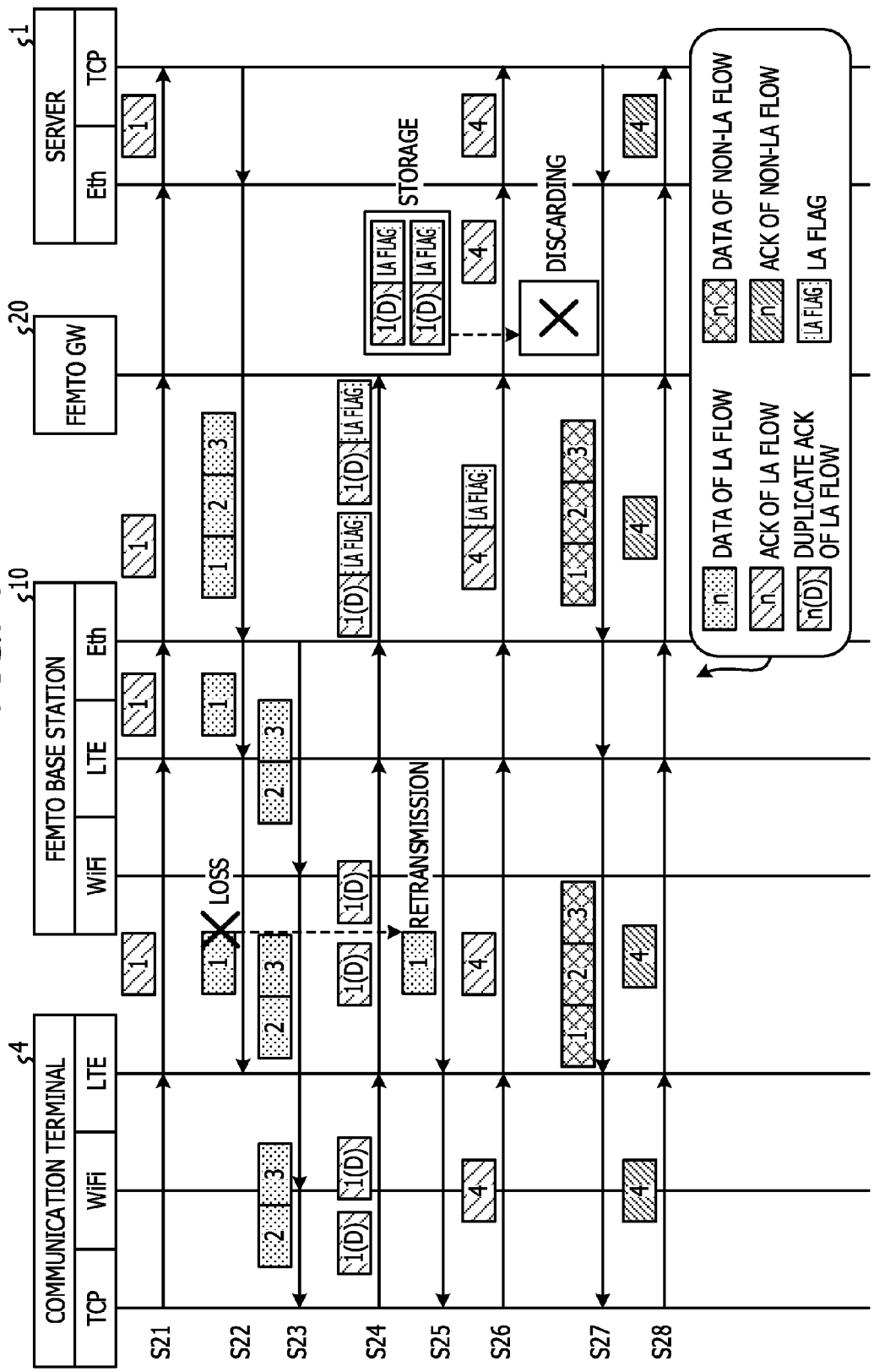
FIG. 7 is a diagram illustrating an example of a process sequence of the communication system according to the first embodiment.
Figure 8:
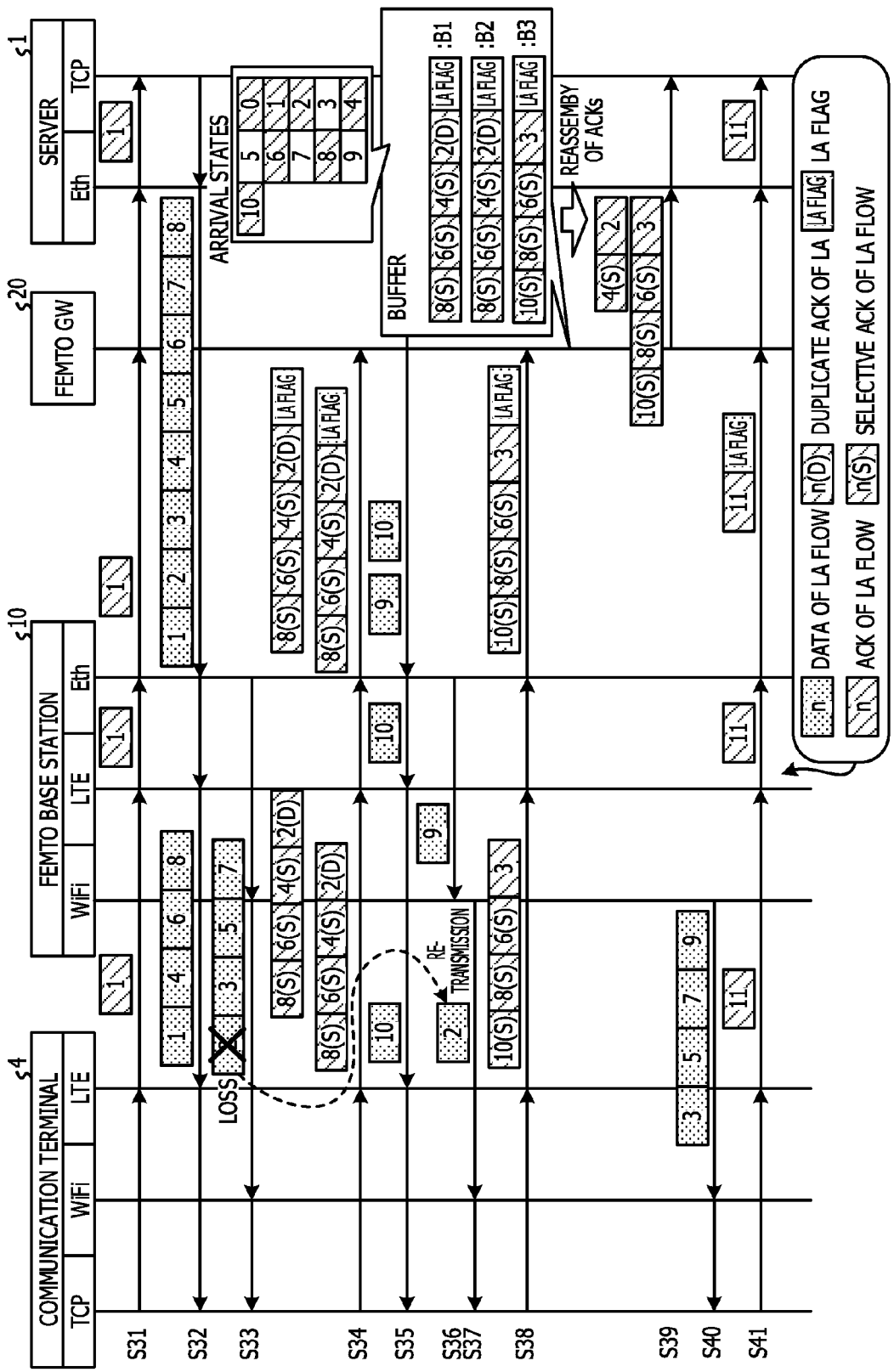
FIG. 8 is a diagram illustrating an example of the process sequence of the communication system according to the first embodiment.

FIGS. 7 and 8 are diagrams illustrating examples of a process sequence of the communication system according to the first embodiment. In FIGS. 7 and 8, "TCP" represents a process to be executed by a processor in accordance with the TCP. In FIGS. 7 and 8, "LTE" of the communication terminal 4 represents an LTE interface of the communication terminal 4, and "WiFi" of the communication terminal 4 represents a WiFi interface of the communication terminal 4. In FIGS. 7 and 8, "WiFi" of the femto base station 10 represents the WiFi communication untie 15, "LTE" of the femto base station 10 represents the LTE communication unit 13, and "Eth" of the femto base station 10 represents the Ethernet communication unit 11. In FIGS. 7 and 8, "Eth" of the server 1 represents the Ethernet interface of the server 1. In FIGS. 7 and 8, "LA flow" represents a flow subjected to the LA, and "non-LA flow" represents a flow that is not subjected to the LA.

As examples of the concealment process executed by the femto GW 2, the "duplicate ACK filtering" is described with reference to FIG. 7 and "ACK reassembly" is described with reference to FIG. 8.

Duplicate ACK Filtering (FIG. 7)

Referring to FIG. 7, the communication terminal 4 uses the LTE link to transmit an ACK packet n=1 to the femto base station 10. At the time of the transmission, the femto base station 10 does not execute the LA on a DL flow corresponding to an UL flow including the ACK packet n=1. Thus, the femto base station 10 does not add an LA flag to the received ACK packet and transmits the ACK packet n=1 to the femto GW 20. Since the LA flag is not added to the received ACK packet, the femto GW 20 transmits the ACK packet n=1 to the server 1 without concealing the ACK packet n=1 (in step S21). In response to the ACK packet n=1, the server 1 transmits a series of data packets n=1, 2, and 3 to the femto base station 10 (in step S22). The femto base station 10 that executes the LA when receiving the data packets n=1, 2, and 3 distributes the data packet n=1 to the LTE link, distributes the data packets n=2 and 3 to the WiFi link, and thereby transmits the data packets n=1, 2, and 3 to the communication terminal 4. It is assumed that the data packet n=1 is lost within the LTE link. Thus, the data packets n=2 and 3 arrive at the communication terminal 4 before arrival of the data packet n=1 (in steps S22 and S23). Specifically, the communication terminal 4 detects a reversed order in which the data packets arrive at the communication terminal 4.

The communication terminal 4 that detects the reversed order uses the LTE link to transmit a duplicate ACK with a number that is the same as the sequence number n=1 of the data packet delayed in arrival. Since the femto base station 10 that receives the duplicate ACK n=1 executes the LA on the DL flow including the data packet n=1, the femto base station 10 adds an LA flag to the duplicate ACK n=1 and transmits the duplicate ACK having the LA flag added thereto to the femto GW 20. Then, the femto GW 20 receives the duplicate ACK having the LA flag thereto and stores the duplicate ACK in a buffer (in step S24).

The femto base station 10 uses the LTE link to retransmit the data packet n=1 in accordance with retransmission control for LTE communication (in step S25). It is assumed that the retransmitted data packet n=1 arrives at the communication terminal 4.

Since the data packets n=1 to 3 arrive at the communication terminal 4 at the time of step S25, the communication terminal 4 uses the LTE link to transmit an ACK packet n=4 in order to notify the femto base station 10 that the data packets n=1 to 3 have arrived at the communication terminal 4. Since a data packet n=4 that is planned to be transmitted by the server 1 and succeeds the data packets n=1 to 3 belongs to the same DL flow as the data packets n=1 to 3 or belongs to the DL flow subjected to the LA, the femto base station 10 receives the ACK packet n=4, adds an LA flag to the ACK packet n=4, and transmits the ACK packet having the LA flag added thereto to the femto GW 20. The femto GW 20 receives the ACK packet having the LA flag added thereto and determines that the data packets n=1 to 3 have arrived at the communication terminal 4. Then, the femto GW 20 discards the duplicate ACK n=1 stored in the buffer. The duplicate ACK n=1 is filtered by the discarding. In addition, since the ACK packet n=4 is not a duplicate ACK, the femto GW 20 deletes the LA flag from the ACK packet n=4 and transmits the ACK packet n=4 after the deletion of the LA flag to the server 1 (in step S26). Specifically, the duplicate ACK is filtered by the femto GW 20 that has received the LA notification from the femto base station 10, and the duplicate ACK is concealed from the server 1. Thus, the reversed order that is detected by the communication terminal 4 is concealed from the server 1, and the server 1 does not retransmit the data packet n=1.

The server 1 receives the ACK packet n=4 after the deletion of the LA flag and transmits a new DL flow since the last data packet of the DL flow including the data packets n=1 to 3 is the data packet n=3. The femto base station 10 determines not to execute the LA on the new DL flow and uses only the LTE link to transmit, to the communication terminal 4, the new DL flow that is not subjected to the LA (in step S27).

The communication terminal 4, which receives the data packets n=1 to 3 included in the DL flow that is not subjected to the LA, uses the LTE link to transmit the ACK packet n=4 in order to notify the femto base station 10 that the data packets n=1 to 3 have arrived at the communication terminal 4. Since the data packets n=1 to 3 transmitted to the communication terminal 4 in step S27 belong to the DL flow that is not subjected to the LA, the femto base station 10 receives the ACK packet n=4 and transmits the ACK packet n=4 to the femto GW 20 without adding an LA flag to the ACK packet n=4. The femto GW 20 receives the ACK packet n=4 without an LA flag and transmits the ACK packet n=4 to the server 1.

ACK Reassembly (FIG. 8)

Referring to FIG. 8, the communication terminal 4 uses the LTE link to transmit the ACK packet n=1 to the femto base station 10. At the time of the transmission, the femto base station 10 does not execute the LA on a DL flow corresponding to an UL flow including the ACK packet n=1. Thus, the femto base station 10 does not add an LA flag to the received ACK packet and transmits the ACK packet n=1 to the femto GW 20. Since the LA flag is not added to the received ACK packet, the femto GW 20 transmits the ACK packet n=1 to the server 1 without concealing the ACK packet n=1 (in step S31). In response to the ACK packet n=1, the server 1 transmits a series of data packets n=1 to 8 to the femto base station 10 (in step S32). The femto base station 10 that executes the LA when receiving the data packets n=1 to 8 distributes the data packets n=1, 4, 6, and 8 to the LTE link and distributes the data packets n=2, 3, 5 and 7 to the WiFi link. It is assumed that the data packets n=1, 4, 6, and 8 arrive at the communication terminal 4 and that the data packet n=2 is lost within the WiFi link. Thus, the femto base station 10 does not transmit the data packets 3, 5, and 7 and stores the data packets 3, 5, and 7 in a buffer of the femto base station (in steps S32 and S33).

Since the data packet n=4 arrives at the communication terminal 4 regardless of the fact that the data packet n=2 does not arrive at the communication terminal 4, the communication terminal 4 superimposes selective ACKs (SACKs) n=4, 6, and 8 on a duplicate ACK n=2 and transmits the duplicate ACK n=2 having the SACKs superimposed thereon. Details of the SACKs are described later. Since the femto base station 10 that receives the duplicate ACK n=2 having the SACKs n=4, 6, and 8 superimposed thereon executes the LA on a DL flow including the data packets n=2, 4, 6, and 8, the femto base station 10 adds an LA flag to the duplicate ACK n=2 and transmits the duplicate ACK n=2 having the LA flag added thereto to the femto GW 20 (in step S34). The femto GW 20 stores the duplicate ACK n=2 having the SACKs n=4, 6, and 8 superimposed thereon and the LA flag added thereto in the buffer (B1 and B2).

Next, the femto base station 10 receives data packets n=9 and 10, distributes the data packet n=10 to the LTE link, and distributes the data packet n=9 to the WiFi link. The data packet n=10 arrives at the communication terminal 4 (in step S35). Since the femto base station 10 has yet to retransmit the data packet n=2 using the WiFi link, the femto base station 10 does not transmit the data packet n=9 and stores the data packet n=9 in the buffer of the femto base station 10 in the same manner as the data packets n=3, 5, and 7 (in step S36).

Then, the femto base station 10 uses the WiFi link to retransmit the data packet n=2, and the data packet n=2 arrives at the communication terminal 4 (in step S37).

Since the data packet n=2 arrives at the communication terminal 4, the communication terminal 4 transmits an ACK packet n=3. In this case, since the data packets n=4, 6, 8, and 10 have already arrived at the communication terminal 4, the communication terminal 4 preferably superimposes SACKs n=4, 6, 8, and 10 on the ACK packet n=3 and transmits the ACK packet having the SACKs superimposed thereon. However, since the number of SACKs that are able to be superimposed on a single ACK packet is limited to up to 3 in accordance with standard specifications, the communication terminal 4 superimposes the SACKs n=6, 8, and 10 on the ACK packet n=3 and transmits the ACK packet n=3 having the SACKs n=6, 8, and 10 superimposed thereon while excluding the SACK with the minimum sequence number n=4. Since the femto base station 10 that receives the ACK packet n=3 having the SACKs n=6, 8, and 10 superimposed thereon executes the LA on a DL flow including the data packets n=6, 8, and 10, the femto base station 10 adds an LA flag to the ACK packet n=3 and transmits the ACK packet n=3 having the LA flag to the femto GW 20 (in step S38). The femto GW 20 stores the ACK packet having the SACKs n=6, 8. And 10 superimposed thereon and the LA flag added thereto in the buffer (B3). At this time, the buffer of the femto GW 20 stores details illustrated in FIGS. 8 (B1 to B3).

When arrival states of the sequence numbers are derived from the details B1 to B3 stored in the buffer of the femto GW 20, the data packets n=3, 5, 7, and 9 that are among the data packets n=1 to 10 have yet to be confirmed to arrive at the communication terminal 4. Since the femto GW 20 has received the ACK packet n=3, the femto GW 20 preferably does not transmit the duplicate ACK n=2 to the server 1. Thus, since the number of SACKs that are able to be superimposed on a single ACK packet is limited to up to 3, the femto GW 20 preferably does not transmit the duplicate ACK n=2 to the server 1, and the amount of the ACK packet and SACKs is preferably reduced as much as possible, it is appropriate that the femto GW 20 reassembles the details B1 to B3 of the buffer into (1) the ACK packet n=2 having the SACK n=4 superimposed thereon and (2) the ACK packet n=3 having the SACKs n=6, 8, and 10 superimposed thereon and transmits the ACK packet n=2 having the SACK n=4 superimposed thereon and the ACK packet n=3 having the SACKs n=6, 8, and 10 superimposed thereon to the server 1 (in step S39).

Even if the femto GW 20 stands by without reassembling the details into the ACK packets in step S39, the data packets n=3, 5, 7, and 9 transmitted by the femto base station 10 arrive at the communication terminal 4 in step S40. Thus, it is sufficient if the femto GW 20 transmits, to the server 1, only an ACK packet n=11 received from the communication terminal 4 through the femto base station 10. In this case, however, the femto GW 20 reassembles the ACK packet in step S39 after a certain time elapses after the storage of the duplicate ACK n=2 in the buffer, and the femto GW 20 transmits the appropriate reassembled ACK packet to the server 1.

In the ACK reassembly, the ACK packet, the duplicate ACK, and SACKs are temporarily stored in the buffer of the femto GW 20, and the femto GW 20 reassembles the ACK packet based on an arrival state of the stored ACK packet and arrival states of the stored SACKs and transmits the ACK packet to the server 1. Thus, the duplicate ACK is not transmitted to the server 1. The duplicate ACK is concealed from the server 1 by the ACK reassembly.

The process of concealing a reversed order includes at least a process of controlling a lower-level device (for example, the femto GW 20) so as to inhibit the lower-level device from transmitting a duplicate ACK received by the lower-level device to a higher-level device (for example, the server 1), like the aforementioned "duplicate ACK filtering" and the aforementioned "ACK reassembly".

Operations of Femto Base Station

Figure 9:
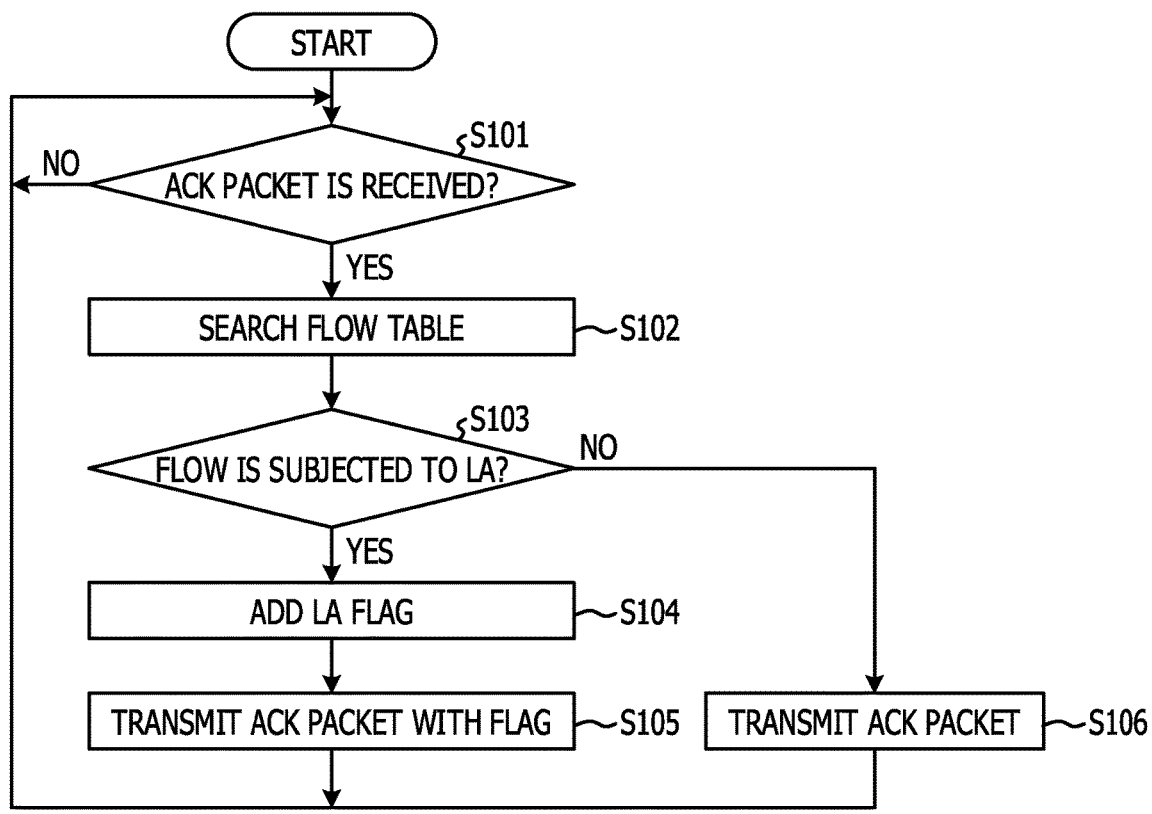
FIG. 9 is a flowchart used to describe operations of the femto base station according to the first embodiment.

FIG. 9 is a flowchart used to describe operations of the femto base station according to the first embodiment. A process represented by the flowchart of FIG. 9 starts when a power supply of the femto base station 10 is turned on, while the process represented by the flowchart of FIG. 9 is stopped when the power supply of the femto base station 10 is turned off.

The femto base station 10 waits to receive an ACK packet of an UL flow (No in step S101).

When the femto base station 10 receives the ACK packet (Yes in step S101), the femto base station 10 searches the flow table 17 (in step S102) and determines whether or not a DL flow corresponding to the UL flow including the ACK packet received in step S101 is subjected to the LA (in step S103).

If the DL flow is subjected to the LA (Yes in step S103), the femto base station 10 adds an LA flag to the ACK packet received in step S101 (in step S104) and transmits the ACK packet having the LA flag added thereto to the femto GW 20 (in step S105).

On the other hand, if the DL flow is not subjected to the LA (No in step S103), the femto base station 10 does not add the LA flag to the ACK packet received in step S101 and transmits the ACK packet without the LA flag to the femto GW 20 (in step S106).

After steps S105 and S106, the process returns to S101.

Operations of Femto GW

Figure 10:
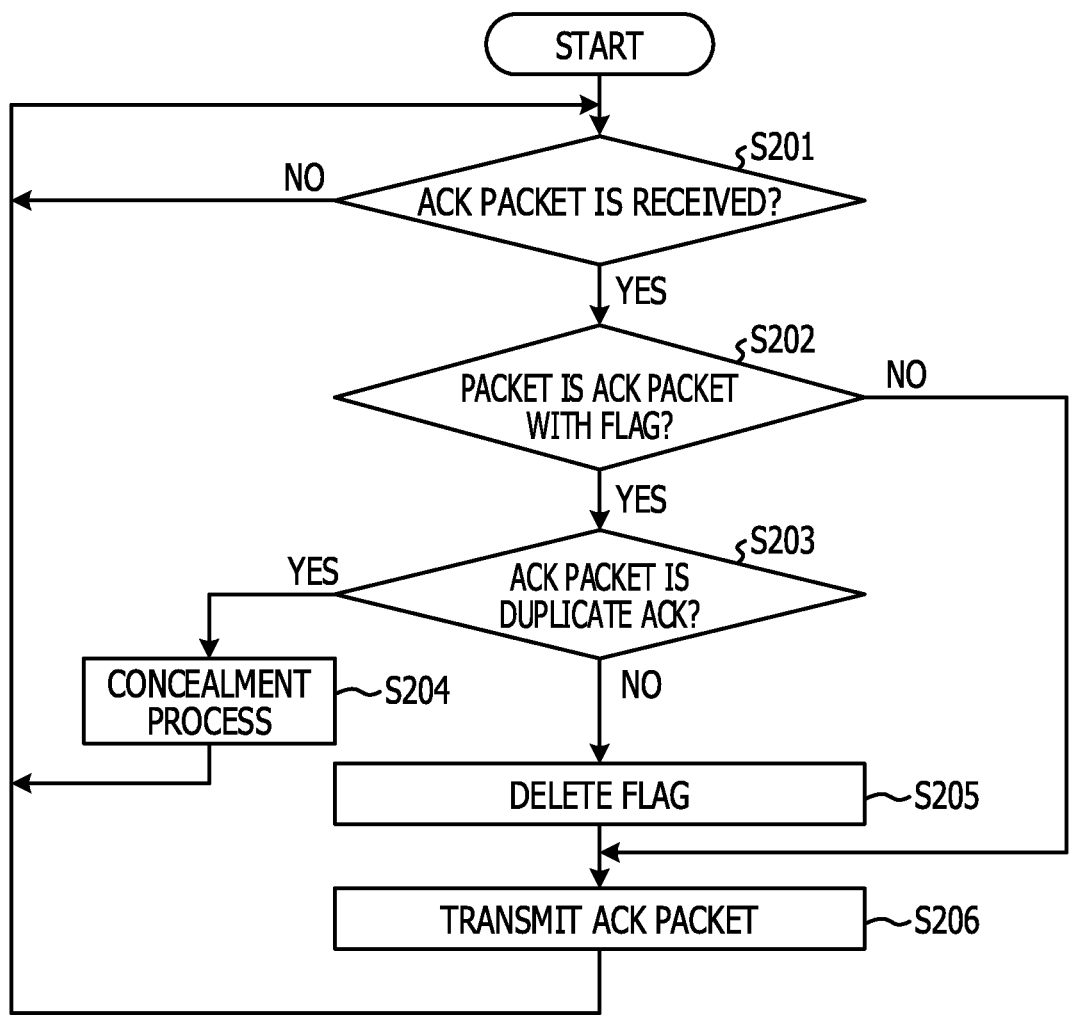
FIG. 10 is a flowchart used to describe operations of the femto GW according to the first embodiment.

FIG. 10 is a flowchart used to describe operations of the femto GW according to the first embodiment. A process represented by the flowchart of FIG. 10 starts when a power supply of the femto GW 20 is turned on, while the process represented by the flowchart of FIG. 10 is stopped when the power supply of the femto GW 20 is turned off.

The femto GW 20 waits to receive the ACK packet of the UL flow (No in step S201).

When the femto GW 20 receives the ACK packet (Yes in step S201), the femto GW 20 determines whether or not the received ACK packet has an LA flag or whether or not the received ACK packet is an ACK packet having the LA flag added thereto (in step S202). If the received ACK packet does not have the LA flag (No in step S202), the femto GW 20 transmits the ACK packet received in step S201 to the server 1 (in step S206).

If the received ACK packet has the LA flag added thereto (Yes in step S202), the femto GW 20 determines whether or not the ACK packet is a duplicate ACK (in step S203). If the ACK packet having the LA flag added thereto is the duplicate ACK (Yes in step S203), the femto GW 20 conceals the duplicate ACK (in step S204).

If the ACK packet having the LA flag is not the duplicate ACK (No in step S203), the femto GW 20 deletes the LA flag from the ACK packet (in step S205) and transmits the ACK packet after the deletion of the LA flag to the server 1 (in step S206).

After steps S204 and S206, the process returns to step S201.

As described above, according to the present embodiment, the communication system 100 includes the server 1, the femto GW 2, the femto base station 3, and the communication terminal 4. In the communication system 1, a series of data packets are transmitted from the server 1 through the femto GW 2 and the femto base station 3 to the communication terminal 4, while a plurality of ACK packets for the data packets are transmitted from the communication terminal 4 through the femto base station 3 and the femto GW 2 to the server 1. When executing the LA on a DL flow including a plurality of data packets, the femto base station 3 transmits the LA notification to the femto GW 2. When receiving the LA notification from the femto base station 3, the femto GW 2 executes the process of concealing a duplicate ACK among a plurality of ACK packets and transmits the other ACK packets remaining after the concealment process to the server 1.

In addition, according to the present embodiment, the femto base station 10 includes the LTE communication unit 13, the WiFi communication unit 15, the LA determining unit 12, the LA notifier 18, and the Ethernet communication unit 11. The LTE communication unit 13 uses the LTE link to communicate with the communication terminal 4. The WiFi communication unit 15 uses the WiFi link to communicate with the communication terminal 4. The LA determining unit 12 determines whether or not the LA is to be executed on a DL flow. The LA notifier 18 forms the LA notification and transmits the formed LA notification to the femto GW 20 through the Ethernet communication unit 11 when the LA is executed on the DL flow.

In addition, according to the present embodiment, the femto GW 20 includes the Ethernet communication unit 22, the concealment processing unit 23, and the Ethernet communication unit 21. The Ethernet communication unit 22 receives the LA notification. When the Ethernet communication unit 22 receives the LA notification, the concealment processing unit 23 conceals a duplicate ACK among a plurality of ACK packets. The Ethernet communication unit 21 transmits the other ACK packets remaining after the concealment process to the server 1.

Thus, the femto GW may execute the process of concealing a reversed order in accordance with the LA notification transmitted from the femto base station instead of the femto base station. Since the femto GW is a core device in general, the femto GW has a higher-performance CPU than a CPU of the femto base station. Since the process of concealing a reversed order includes the process of buffering a duplicate ACK, the concealment process tends to significantly increase CPU utilization. CPU utilization of the process (for example, the process of adding an LA flag) of providing the LA notification is much lower than CPU utilization of the process of concealing a reversed order. Thus, since the femto GW executes the concealment process of which the CPU utilization is high and of which a delay is accepted instead of the femto base station, an increase in CPU utilization of the femto base station may be suppressed and a reduction in throughput may be inhibited.

Second Embodiment

A second embodiment is different from the first embodiment in that if a process load of a femto base station is lower than a threshold, the femto base station executes the process of concealing a reversed order instead of a femto GW in the second embodiment. Thus, the femto base station according to the second embodiment provides the LA notification to the femto GW if the process load of the femto base station is lower than the threshold.

Example of Configuration of Femto Base Station

Figure 11:
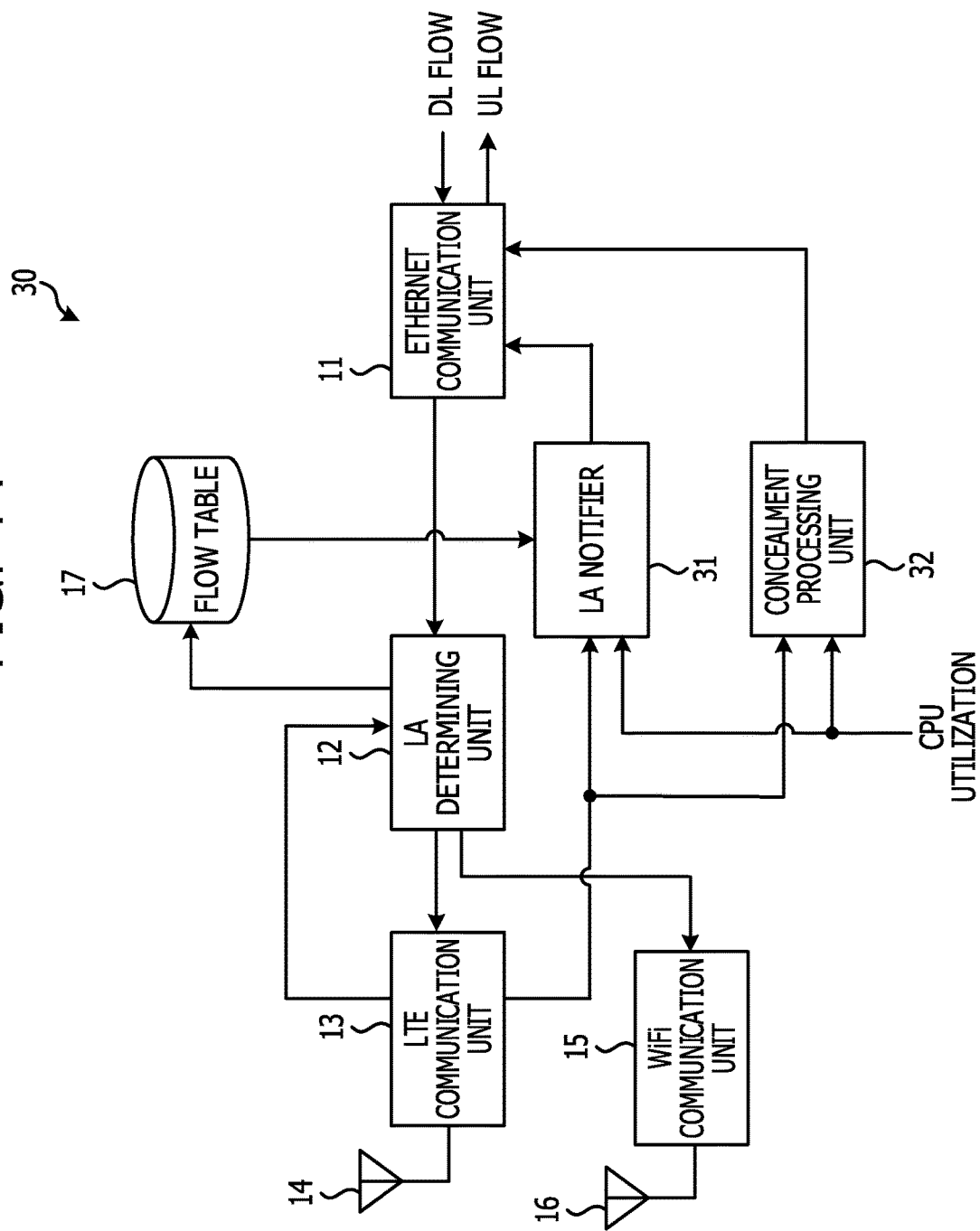
FIG. 11 is a functional block diagram illustrating an example of a femto base station according to a second embodiment.

FIG. 11 is a functional block diagram illustrating an example of the femto base station according to the second embodiment. A femto base station 30 illustrated in FIG. 11 corresponds to the femto base station illustrated in FIG. 2. The femto base station 30 includes an LA notifier 31 and a concealment processing unit 32.

The utilization of a CPU included in the femto base station 30 is input to the LA notifier 31 and the concealment processing unit 32 as a parameter representing a process load of the femto base station 30, for example. In addition, an UL flow is input to the LA notifier 31 and the concealment processing unit 32 from the LTE communication unit 13.

The LA notifier 31 determines whether or not the CPU utilization of the femto base station 30 is equal to or higher than the threshold. If the CPU utilization of the femto base station 30 or the process load of the femto base station 30 is equal to or higher than the threshold, the LA notifier 31 forms the LA notification in the same manner as the LA notifier 18 according to the first embodiment. Thus, if the CPU utilization of the femto base station 30 is equal to or higher than the threshold, the femto GW 20 executes the process of concealing a reversed order. On the other hand, if the CPU utilization of the femto base station 30 or the process load of the femto base station 30 is lower than the threshold, the LA notifier 31 does not form the LA notification. Thus, if the CPU utilization of the femto base station 30 is lower than the threshold, the femto GW 20 does not execute the process of concealing a reversed order.

The concealment processing unit 32 determines whether or not the CPU utilization of the femto base station 30 is equal to or higher than the threshold. If the CPU utilization of the femto base station 30 is equal to or higher than the threshold, the femto GW 20 executes the process of concealing a reversed order as described above. Thus, if the CPU utilization of the femto base station 30 is equal to or higher than the threshold, the concealment processing unit 32 does not execute the process of concealing a reversed order. On the other hand, if the CPU utilization of the femto base station 30 is lower than the threshold, the femto GW 20 does not execute the process of concealing a reversed order as described above. Thus, if the CPU utilization of the femto base station 30 is lower than the threshold, the concealment processing unit 32 executes the process of concealing a reversed order in the same manner as the concealment processing unit 23 of the femto GW 20.

Operations of Femto Base Station

Figure 12:
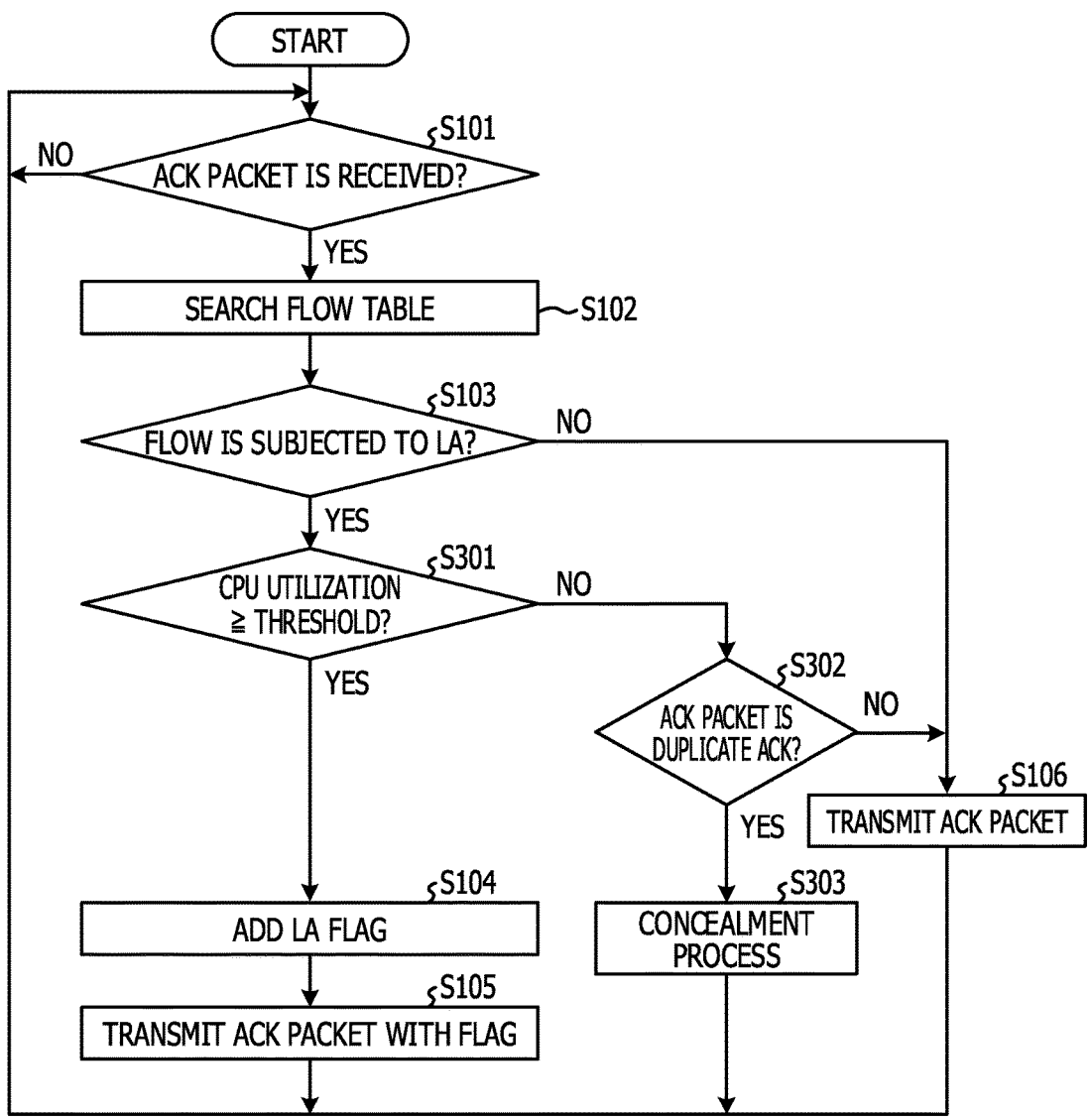
FIG. 12 is a flowchart used to describe operations of the femto base station according to the second embodiment.

FIG. 12 is a flowchart used to describe operations of the femto base station according to the second embodiment. A process represented by the flowchart of the FIG. 12 starts if a power supply of the femto base station 30 is turned on, while the process represented by the flowchart of the FIG. 12 is stopped if the power supply of the femto base station 30 is turned off.

If the DL flow is subjected to the LA (Yes in step S103), the femto base station 30 determines whether or not the CPU utilization of the femto base station 30 is equal to or higher than the threshold (in step S301). If the CPU utilization of the femto base station 30 is equal to or higher than the threshold (Yes in step S301), the femto base station 30 adds the LA flag to the ACK packet received in step S101 (in step S104) and transmits the ACK packet having the LA flag added thereto to the femto GW 20 (in step S105).

On the other hand, if the CPU utilization of the femto base station 30 is lower than the threshold (No in step S301), the femto base station 30 determines whether or not the ACK packet included in the UL flow is a duplicate ACK (in step S302). If the ACK packet is the duplicate ACK (Yes in step S302), the femto base station 30 executes the process of concealing the duplicate ACK (in step S303). After the process of step S303, the process returns to S101.

If the ACK packet is not the duplicate ACK (No in step S302), the femto base station 30 transmits the ACK packet to the femto GW 20 (in step S106).

As described above, according to the second embodiment, if the process load of the femto base station 30 is equal to or higher than the threshold, the femto base station 30 provides the LA notification to the femto GW 20.

Thus, if the process load of the femto base station 30 is equal to or higher than the threshold, the femto GW 20 executes the process of concealing a reversed order instead of the femto base station 30. If the process load of the femto base station 30 is lower than the threshold, the femto base station 30 executes the process of concealing a reversed order and the femto GW 20 does not execute the process of concealing a reversed order. Thus, according to the second embodiment, a load of the process of concealing a reversed order may be appropriately distributed between the femto base station 30 and the femto GW 20.

Third Embodiment

A third embodiment is different from the first embodiment in that when receiving the LA notification from a femto base station, a femto GW determines, based on communication link information, whether to execute the process of concealing a reversed order in the third embodiment. Thus, the femto base station according to the third embodiment transmits the LA notification and the communication link information to the femto GW. The "communication link information" is information that represents whether or not each of data packets included in a DL flow has been transmitted from the femto base station to the communication terminal using any of the LTE link and the WiFi link.

Example of Configuration of Femto Base Station

Figure 13:
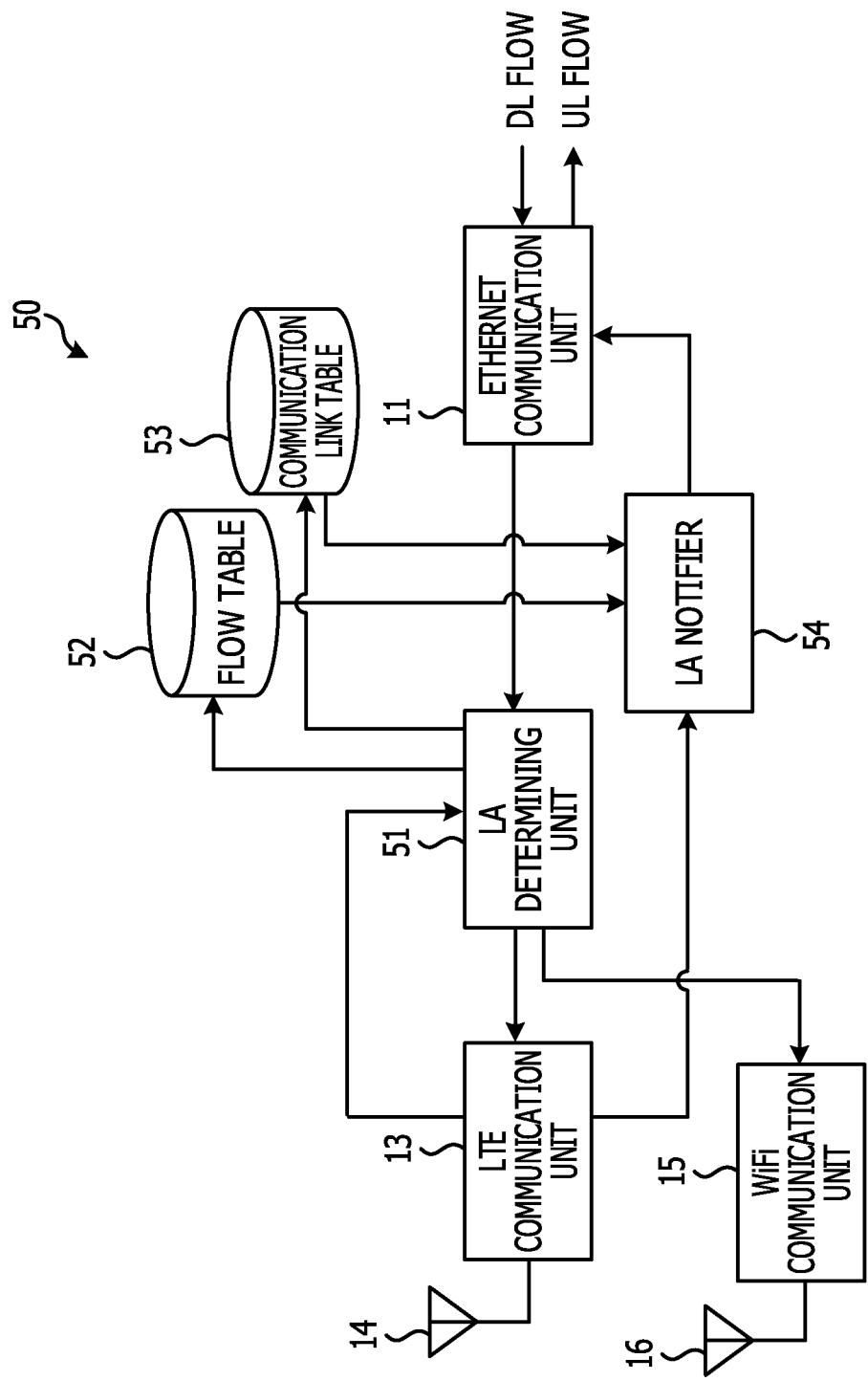
FIG. 13 is a functional block diagram illustrating an example of a femto base station according to a third embodiment.

FIG. 13 is a functional block diagram illustrating an example of the femto base station according to the third embodiment. A femto base station 50 illustrated in FIG. 13 corresponds to the femto base station illustrated in FIG. 2. The femto base station 50 includes an LA determining unit 51, a flow table 52, a communication link table 53, and an LA notifier 54.

The LA determining unit 51 executes the following process and the process that is executed by the LA determining unit 12 according to the first embodiment. Specifically, as illustrated in FIG. 14, the LA determining unit 51 forms the flow table 52 in which pointers p1 to p4 that represent communication link tables are added to DL flows 1 to 4 represented in the flow table 17 (illustrated in FIG. 4) described in the first embodiment. FIG. 14 is a diagram illustrating an example of the flow table according to the third embodiment.

In addition, the LA determining unit 51 registers communication link information in the communication link tables corresponding to the pointers p1 to p4 in accordance with results of distributing the data packets to the LTE communication unit 13 and the WiFi communication unit 15. FIG. 15 is a diagram illustrating an example of the communication link tables according to the third embodiment. FIG. 15 illustrates the communication link table corresponding to the pointer p1 as an example. Specifically, the communication link table 53 includes the plurality of communication link tables corresponding to the pointers p1 to p4. The communication link table illustrated in FIG. 15 represents that the data packet n=1 that is among the data packets n=1 to 3 included in the DL flow 1 has been transmitted using the LTE link and that the data packets n=2 and 3 that are among the data packets n=1 to 3 included in the DL flow 1 have been transmitted using the WiFi link.

Figure 16:
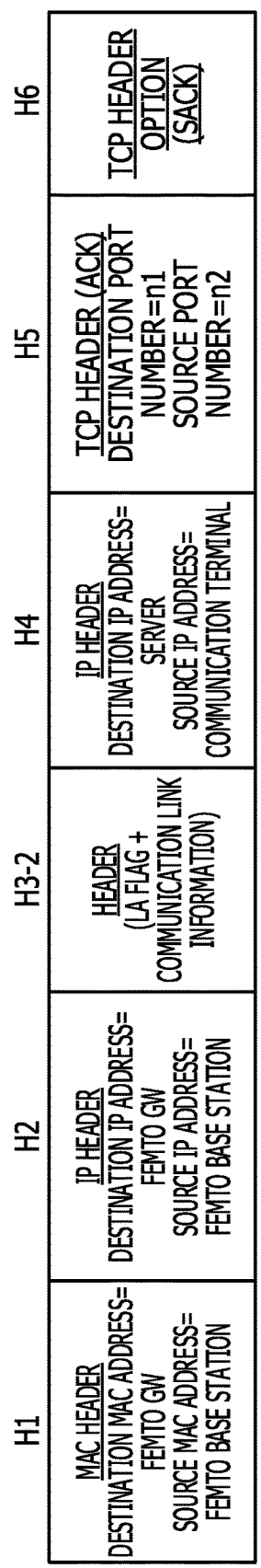
FIG. 16 is a diagram illustrating an example of an ACK packet according to the third embodiment.

The LA notifier 54 executes the following process and the process that is executed by the LA notifier 18 according to the first embodiment. Specifically, the LA notifier 54 provides the LA notification and communication link information to the femto GW 2. The LA notifier 54, however, does not use a GRE header as an LA flag. The LA notifier 54 forms the LA notification and the communication link information in the following manner, for example. FIG. 16 is a diagram illustrating an example of an ACK packet according to the third embodiment.

An ACK packet that is input to the LA notifier 54 from the LTE communication unit 13 has an IP header H4, a TCP header H5, and a TCP header option H6. A type of the TCP header H5 is an "ACK", while a type of the TCP header option H6 is an "SACK". The LA notifier 54 adds a header H3-2 to the IP header H4, TCP header H5, and TCP header option H6 of the ACK packet included in an UL flow corresponding to a DL flow subjected to the LA. The header H3-2 includes an LA flag and communication link information of the DL flow subjected to the LA. The LA notifier 54 identifies the DL flow subjected to the LA by searching the flow table 52 based on IP addresses and port numbers of the headers H4 and H5 in the same manner as the first embodiment. The LA notifier 54 acquires the communication link information of the DL flow subjected to the LA by searching the communication link table 53 using the pointers represented by the flow table 52 as keys. For example, when the LA notifier 54 identifies the "DL flow 1" by searching the flow table 52, the LA notifier 54 searches the communication link table 53 using the pointer p1 as a key and acquires the communication link information that represents that the data packet n=1 has been transmitted using the LTE link and that the data packets n=2 and 3 have been transmitted using the WiFi link. After acquiring the communication link information of the data packets, the LA notifier 54 deletes acquired communication link information of sequence numbers from the communication link tables. Then, the LA notifier 54 adds a MAC header H1 and an IP header H2 to the header H3-2, the IP header H4, the TCP header H5, and the TCP header option H6 so as to form the ACK packet and outputs the formed ACK packet to the Ethernet communication unit 11.

The LA notifier 54 does not add a header H3-2 to an ACK packet included in an UL flow corresponding to a DL flow that is not subjected to the LA, and the LA notifier 54 adds an MAC header H1 and an IP header H2 directly to an IP header H4, a TCP header H5, and a TCP header option H6 so as to form the ACK packet and outputs the formed ACK packet to the Ethernet communication unit 11.

Example of Configuration of Femto GW

Figure 17:
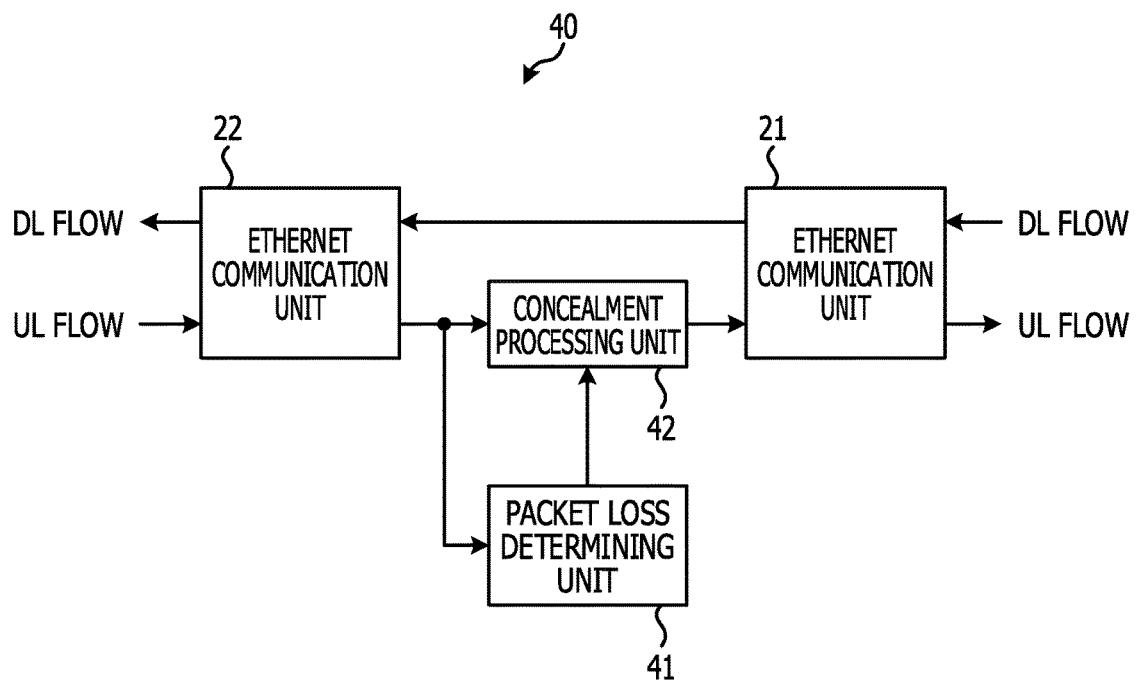
FIG. 17 is a functional block diagram illustrating an example of a femto GW according to the third embodiment.

FIG. 17 is a functional block diagram illustrating an example of the femto GW according to the third embodiment. A femto GW 40 illustrated in FIG. 17 corresponds to the femto GW 2 illustrated in FIG. 2. The femto GW 40 includes a packet loss determining unit 41 and a concealment processing unit 42.

An UL flow is input to the packet loss determining unit 41 from the Ethernet communication unit 22. If the UL flow input from the Ethernet communication unit 22 includes the LA notification, the packet loss determining unit 41 determines, based on communication link information notified from the femto base station 50, whether or not the process of concealing a reversed order is to be executed.

It is assumed that arrival of a first data packet transmitted using a first wireless link is not confirmed, arrival of a second data packet transmitted using a second wireless link is confirmed, and the first data packet has a smaller sequence number than the second data packet. In this case, reasons why the arrival of the first data packet is not confirmed are considered to be that the first data packet is lost and that a delay time within the first wireless link is larger than a delay time within the second wireless link.

If arrival of a certain data packet, which is among a plurality of data packets transmitted using the same wireless link and has a smaller sequence number than a data packet that is among the plurality of data packets and have been confirmed to have arrived, is not confirmed, it may be determined that the certain data packet has been lost within the wireless link.

For example, it is assumed that the data packet n=1 is transmitted using the LTE link, the data packets n=2 and 3 are transmitted using the WiFi link, a duplicate ACK n=2 for the data packet n=2 is transmitted. Specifically, it is assumed that arrival of the data packet n=2 is not confirmed. In this case, it may be determined that the data packet n=2 and the data packet n=3 are transmitted using the same wireless link and that if arrival of the data packet n=3 is confirmed, the data packet n=2 is lost within the wireless link. Thus, the packet loss determining unit 41 determines whether or not the packet has been lost in the following manner.

For example, communication link information included in an ACK packet represents that the data packets n=2 and 3 are transmitted using the WiFi link as illustrated in FIG. 15. When a duplicate ACK for the data packet n=2 that is among the data packets n=2 and 3 transmitted using the WiFi link and of which the sequence number is smaller than the sequence number of the data packet n=3 for which an SACK is transmitted is transmitted, the packet loss determining unit 41 that acquires the aforementioned communication link information determines that the duplicate ACK is transmitted due to the loss of the data packet n=2. In this case, the packet loss determining unit 41 determines that the data packet n=2 has been lost. In a case other than the aforementioned case, the packet loss determining unit 41 determines that the data packet n=2 has not been lost. SACKs are selectively used by the communication terminal 4 and are ACKs that each uniquely represent a packet that has arrived at the communication terminal 4. Specifically, the SACK n=3 represents that the data packet n=3 has arrived at the communication terminal 4. In addition, it is assumed that the transmission of the SACK is optional, and negotiation has been executed between the communication terminal 4 and the server 1 so as to ensure that the SACK is used between the communication terminal 4 and the server 1.

If the packet loss determining unit 41 determines that a data packet has been lost, the packet loss determining unit 41 determines that the femto GW 40 transmits a duplicate ACK for the data packet to the server 1 without concealing the duplicate ACK. Specifically, if the packet loss determining unit 41 determines that the data packet has been lost, the packet loss determining unit 41 determines that the process of concealing a reversed order is not to be executed.

On the other hand, if the packet loss determining unit 41 determines that a data packet has not been lost, the packet loss determining unit 41 determines that the femto GW 40 conceals a duplicate ACK for the data packet. Specifically, if the packet loss determining unit 41 determines that the data packet has not been lost, the packet loss determining unit 41 determines that the process of concealing a reversed order is to be executed.

Then, the packet loss determining unit 41 outputs, to the concealment processing unit 41, the result of the determination of whether or not the process of concealing a reversed order is to be executed.

If the concealment processing unit 42 receives, from the packet loss determining unit 41, the determination result that represents that the concealment process is to be executed, the concealment processing unit 42 conceals the duplicate ACK in the same manner as the concealment processing unit 23 according to the first embodiment. On the other hand, if the concealment processing unit 42 receives, from the packet loss determining unit 41, the determination result that represents that the concealment process is not to be executed, the concealment processing unit 42 outputs the duplicate ACK to the Ethernet communication unit 21 without concealing the duplicate ACK.

Process Sequence of Communication System

Figure 18:
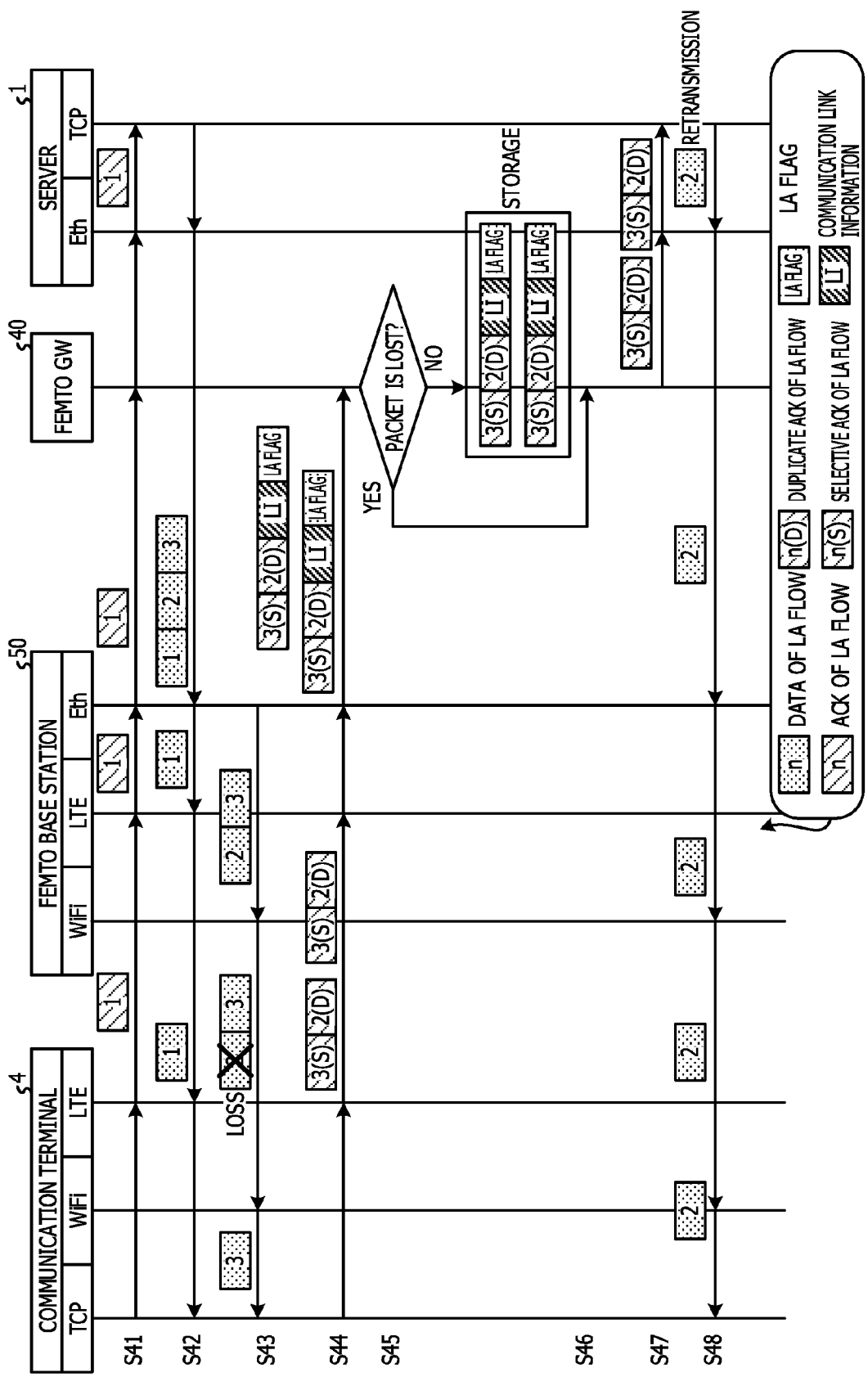
FIG. 18 is a diagram illustrating an example of a process sequence of a communication system according to the third embodiment.

FIG. 18 is a diagram illustrating an example of a process sequence of the communication system according to the third embodiment. As an example of the concealment process to be executed by the femto GW 40, the "duplicate ACK filtering" is described with reference to FIG. 18.

Referring to FIG. 18, the communication terminal 4 uses the LTE link to transmit the ACK packet n=1 to the femto base station 10. At the time of the transmission, the femto base station 10 does not execute the LA on a DL flow corresponding to an UL flow including the ACK packet n=1. Thus, the femto base station 10 does not add an LA flag to the received ACK packet n=1 and transmits the ACK packet n=1 to the femto GW 40. Since the LA flag is not added to the received ACK packet, the femto GW 40 transmits the ACK packet n=1 to the server 1 without concealing the ACK packet n=1 (in step S41). In response to the ACK packet n=1, the server 1 transmits a series of data packets n=1, 2, and 3 to the femto base station 50 (in step S42). The femto base station 50 that executes the LA when receiving the data packets n=1, 2, and 3 distributes the data packet n=1 to the LTE link, distributes the data packets n=2 and 3 to the WiFi link, and transmits the data packets n=1, 2, and 3 to the communication terminal 4. It is assumed that the data packet n=2 is lost within the WiFi link. Thus, the data packet n=3 arrives at the communication terminal 4 before arrival of the data packet n=2 (in step S43). It is assumed that the data packet n=2 is retransmitted but finally lost.

The communication terminal 4 uses the LTE link to transmit the duplicate ACK that has the same sequence number as the sequence number of the data packet n=2 that has yet to arrive at the communication terminal 4. In this case, the communication terminal 4 superimposes the SACK n=3 on the duplicate ACK n=2 and transmits the duplicate ACK n=2 having the SACK n=3 superimposed thereon (in step S44).

Since the femto base station 50 that receives the duplicate ACK n=2 having the SACK n=3 superimposed thereon currently executes the LA on a DL flow including the data packets n=2 and 3, the femto base station 50 adds an LA flag and communication link information to the duplicate ACK n=2 and transmits, to the femto GW 40, the duplicate ACK n=2 having the SACK n=3 superimposed thereon and the LA flag and the communication link information added thereto (in step S44).

The femto GW 40 that receives the duplicate ACK n=2 having the SACK n=3 superimposed thereon and the LA flag and the communication link information added thereto determines, based on the communication link information, whether or not the data packet n=2 has been lost (in step S45).

Then, if the femto GW 40 determines that the data packet n=2 has not been lost (No in step S45), the femto GW 40 stores, in the buffer, the duplicate ACK n=2 having the SACK n=3 superimposed thereon and the LA flag and the communication link information added thereto (in step S46).

On the other hand, if the femto GW 40 determines that the data packet n=2 has been lost (Yes in step S45), the femto GW 40 does not store the duplicate ACK in the buffer, deletes the LA flag and the communication link information from the duplicate ACK n=2, and transmits the duplicate ACK n=2 having the SACK n=3 superimposed thereon to the server 1. Thus, the femto GW 40 quickly instructs the server 1 to retransmit the data packet n=2 (in step S47).

The server 1 that receives the duplicate ACK n=2 having the SACK n=3 superimposed thereon is instructed by the SACK n=3 and the duplicate ACK n=2 to retransmit the data packet n=2 and retransmits the data packet n=2 (in step S48).

Operations of Femto Base Station

Figure 19:
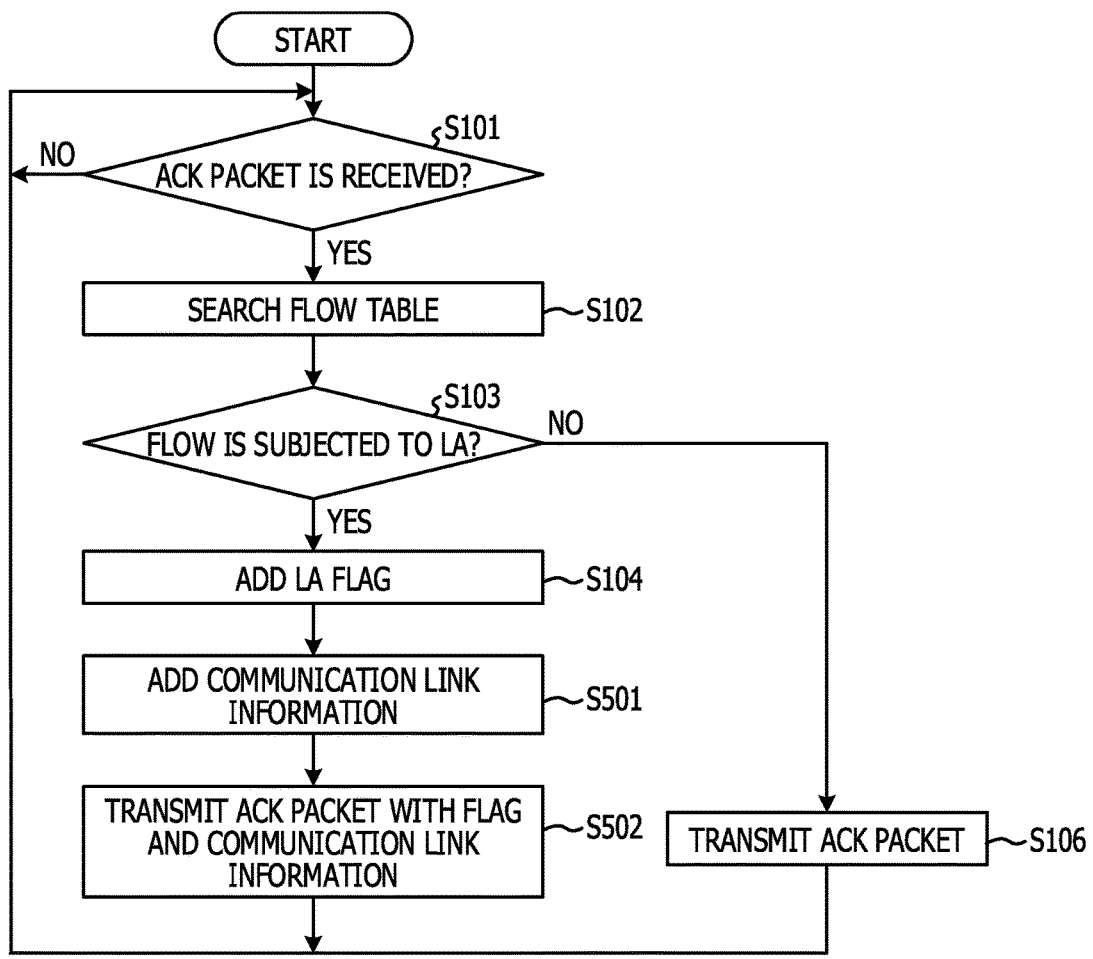
FIG. 19 is a flowchart used to describe operations of the femto base station according to the third embodiment.

FIG. 19 is a flowchart used to describe operations of the femto base station according to the third embodiment. A process represented by the flowchart of FIG. 19 starts when a power supply of the femto base station 50 is turned on, while the process represented by the flowchart of FIG. 19 is stopped when the power supply of the femto base station 50 is turned off.

If the DL flow is subjected to the LA (Yes in step S103), the femto base station 10 adds the LA flag to the ACK packet received in step S101 (in step S104) and adds communication link information to the ACK packet received in step S101 (in step S501). Then, the femto base station 10 transmits the ACK packet having the LA flag and the communication link information to the femto GW 40 (in step S502). After the process of step S502, the process returns to step S101.

Operations of Femto GW

Figure 20:
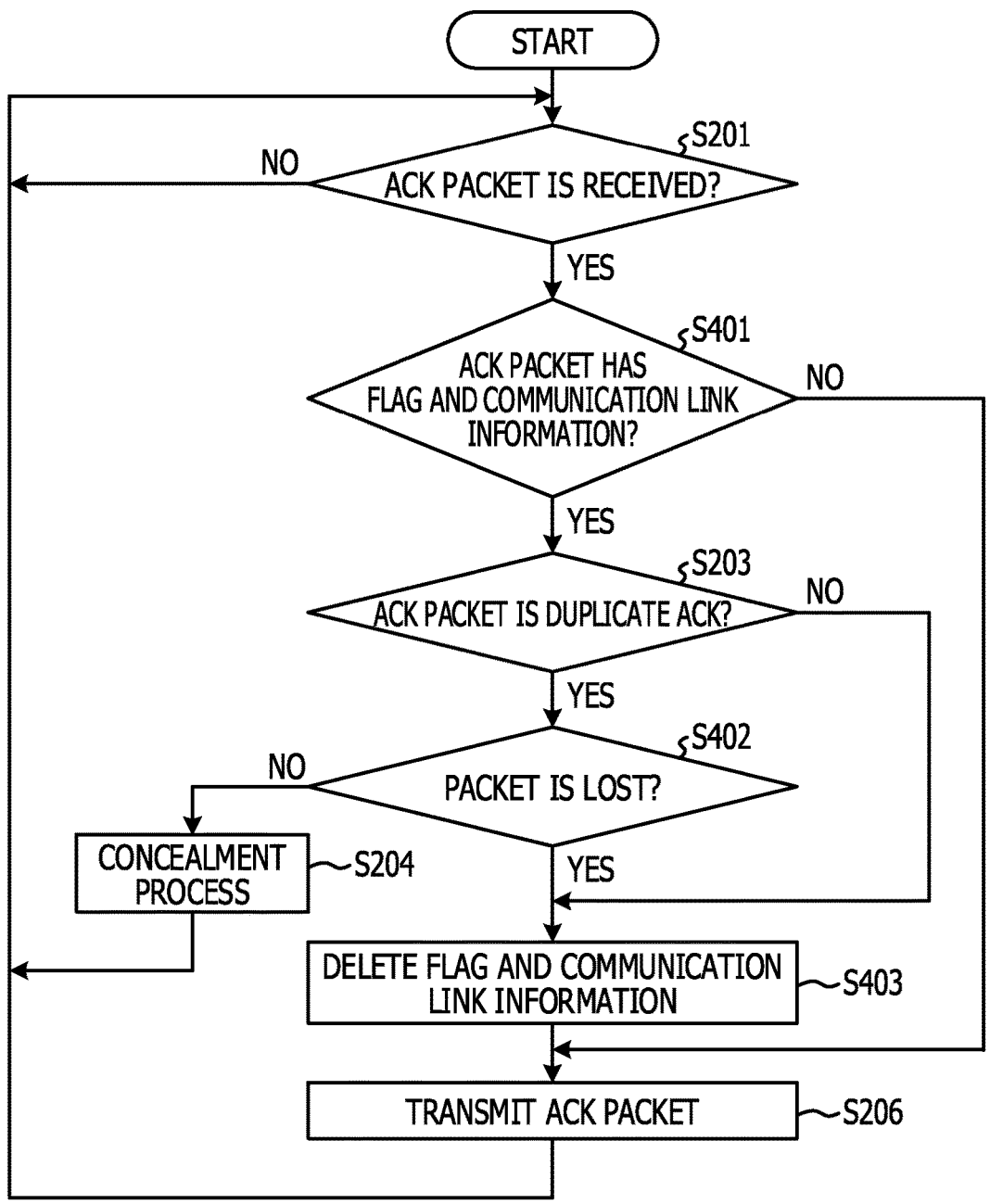
FIG. 20 is a flowchart used to describe operations of the femto GW according to the third embodiment.

FIG. 20 is a flowchart used to describe operations of the femto GW according to the third embodiment. A process represented by the flowchart of FIG. 20 starts when a power supply of the femto GW 40 is turned on, while the process represented by the flowchart of FIG. 20 is stopped when the power supply of the femto GW 40 is turned off.

When receiving the ACK packet (in step S201), the femto GW 40 determines whether or not the received ACK packet has an LA flag and communication link information added thereto or whether or not the received ACK packet is an ACK packet having the LA flag and the communication link information added thereto (in step S401). If the received ACK packet does not have the LA flag and the communication link information (No in step S401), the femto GW 40 transmits the ACK received in step S201 to the server 1 (in step S206).

If the received ACK packet has the LA flag and the communication link information added thereto (Yes in step S401), the femto GW 40 determines whether or not the ACK packet is a duplicate ACK (in step S203). If the ACK packet that has the LA flag and the communication link information added thereto is the duplicate ACK (Yes in step S203), the femto GW 40 determines, based on the communication link information, whether or not a data packet has been lost (in step S402). If the femto GW 40 determines that the packet has not been lost (No in step S402), the femto GW 40 conceals the duplicate ACK (in step S204).

If the received ACK packet that has the LA flag and the communication link information added thereto is not the duplicate ACK (No in step S203) or if the femto GW 40 determines that the data packet has been lost (Yes in step S402), the femto GW 40 deletes the LA flag and the communication link information from the ACK packet (in step S403) and transmits the ACK packet after the deletion of the LA flag and the communication link information to the server 1 (in step S206).

After the processes of step S204 and S206, the process returns to step S201.

As described above, according to the present embodiment, the femto base station 50 transmits, to the femto GW 40, communication link information that represents that each of data packets has been transmitted to the communication terminal 4 using any of the LTE link or the WiFi link. When receiving the LA notification from the femto base station 50, the femto GW 40 determines, based on the communication link information, whether to execute the process of concealing a reversed order.

Thus, if a data packet is lost, the femto GW 40 may quickly instruct the server 1 to retransmit the data packet. A reduction in the throughput may be suppressed more significantly than the first embodiment.

Fourth Embodiment

A fourth embodiment is different from the first embodiment in that a communication system has a plurality of femto GWs and a femto base station provides the LA notification to a specific femto GW that is among the plurality of femto GWs and of which a process load is lower than a threshold in the fourth embodiment.

Example of Configuration of Communication System

Figure 21:
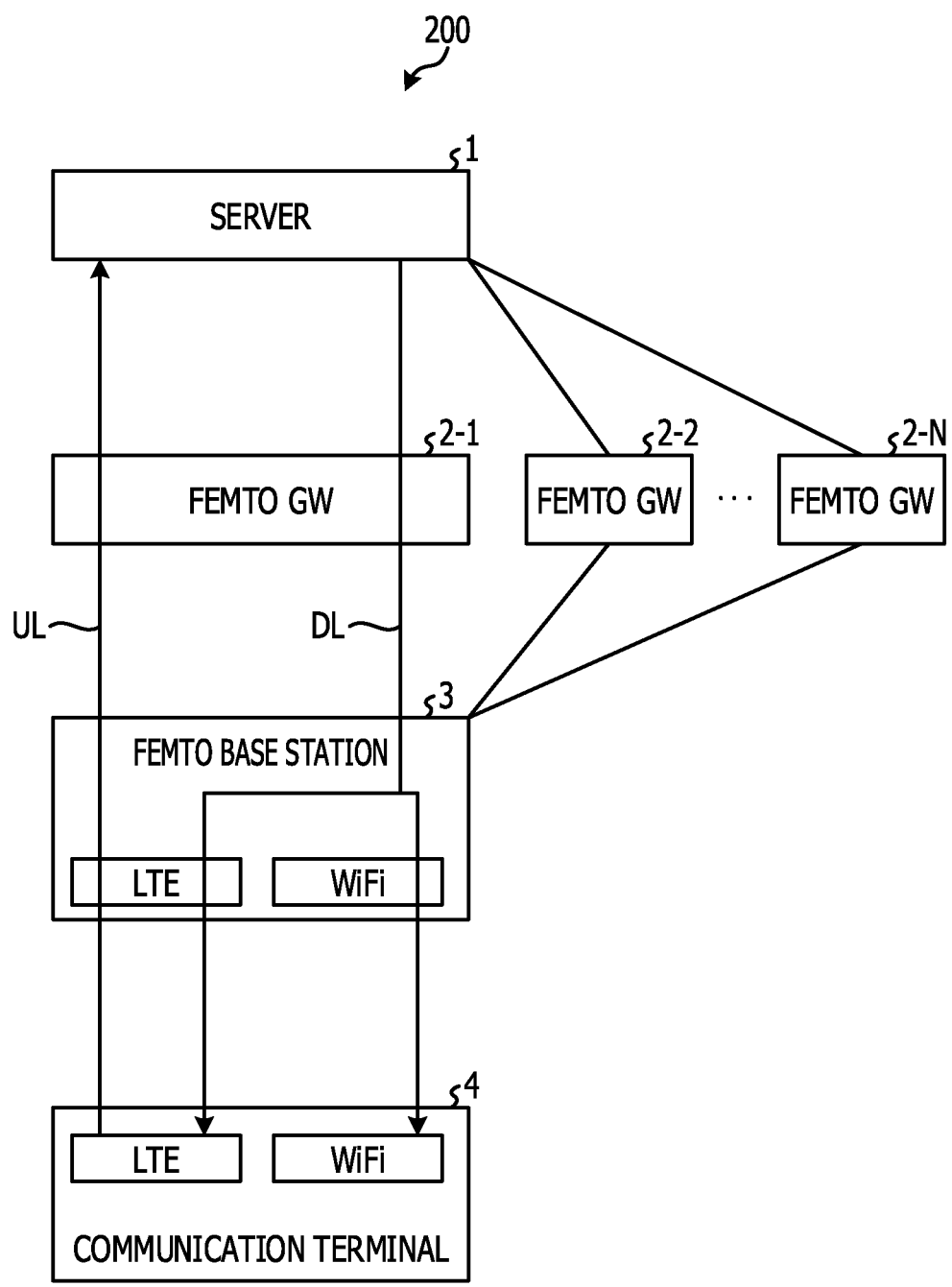
FIG. 21 is a diagram illustrating an example of a configuration of a communication system according to a fourth embodiment.

FIG. 21 is a diagram illustrating an example of a configuration of the communication system according to the fourth embodiment. A communication system 200 illustrated in FIG. 21 includes a plurality of femto GWs 2-1 to 2-N. The femto GWs 2-1 to 2-N are connected to the server 1 and the femto base station 2. The femto GWs 2-1 to 2-N have the same configuration.

Example of Configuration of Femto Base Station

Figure 22:
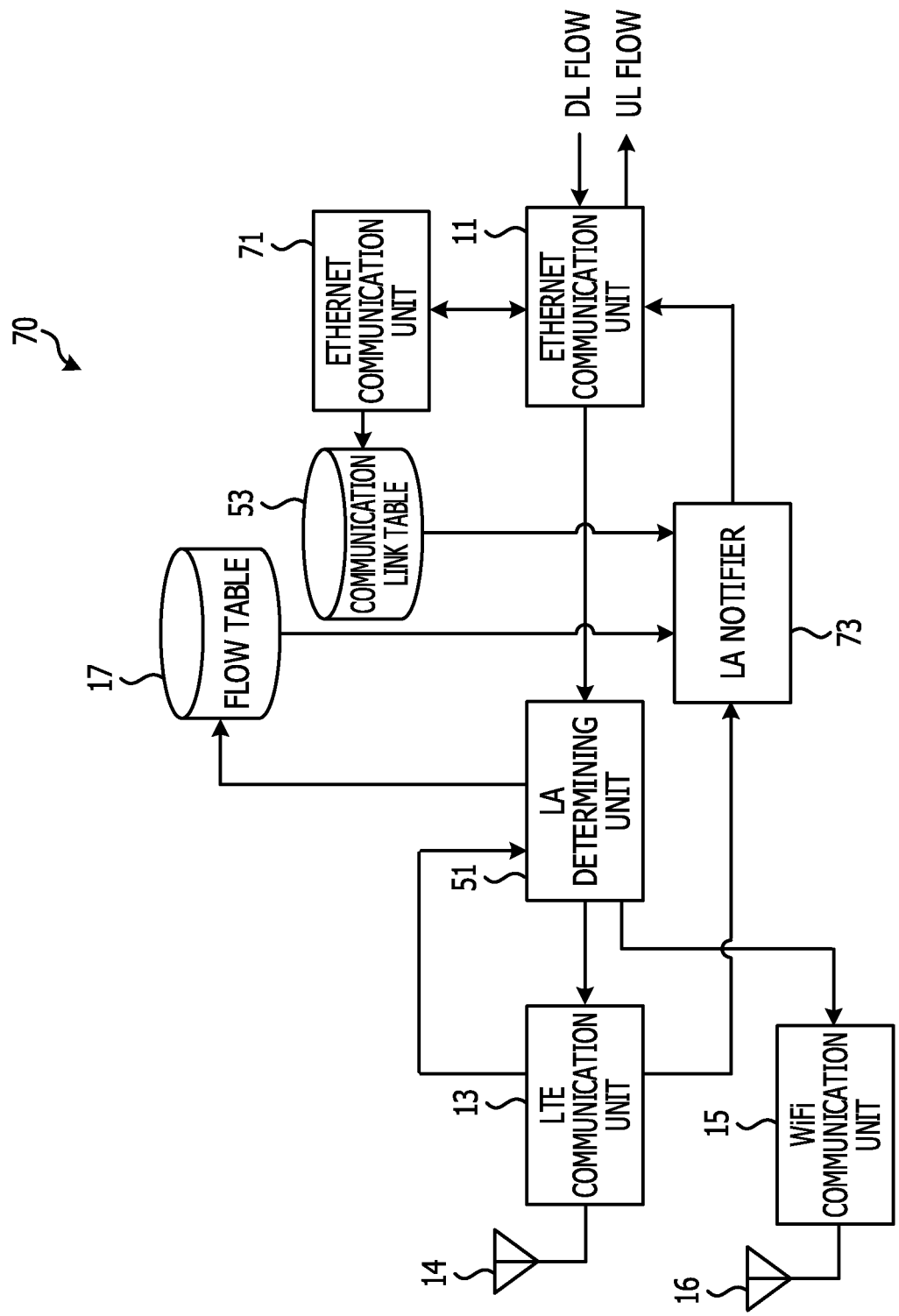
FIG. 22 is a functional block diagram illustrating an example of a femto base station according to the fourth embodiment.

FIG. 22 is a functional block diagram illustrating an example of the femto base station according to the fourth embodiment. A femto base station 70 illustrated in FIG. 22 corresponds to the femto base station 3 illustrated in FIG. 21. The femto base station 70 includes a load state acquirer 71, a load state table 72, and an LA notifier 73.

The load state acquirer 71 acquires load states of the femto GWs 2-1 to 2-N. Specifically, the load state acquirer 71 inquires of the femto GWs 2-1 to 2-N about the load states. The inquiries about the load states are input to the Ethernet communication unit 11 and transmitted to the femto GWs. Then, the load state acquirer 71 acquires the load states transmitted from the femto GWs 2-1 to 2-N in response to the inquiries about the load states. A DL flow that includes information representing the load states of the femto GWs is received by the Ethernet communication unit 11 and input to the load state acquirer 71. Then, the load state acquirer 71 acquires the load states of the femto GWs 2-1 to 2-N from the input DL flow and registers the acquired load states in the load state table 72.

FIG. 23 is a diagram illustrating an example of the load state table according to the fourth embodiment. femto GWs

1 to #3 illustrated in FIG. 23 correspond to the femto GWs 2-1 to 2-N illustrated in FIG. 21. FIG. 23 illustrates a case where the three femto GWs #1 to #3 are connected to the femto base station 70. In addition, FIG. 23 illustrates the case where a process load of the femto GW #1 is low and process loads of the femto GWs #2 and #3 are high. In this case, the "low process load" is lower than the threshold, and the "high process loads" are equal to or higher than the threshold, for example. For example, if CPU utilization of a femto GW is lower than the threshold, a process load of the femto GW is low. For example, if the CPU utilization of the femto GW is equal to or higher than the threshold, the process load of the femto GW is high.

The LA notifier 73 executes the following process and the process that is executed by the LA notifier 18 according to the first embodiment. Specifically, in order to provide the LA notification, the LA notifier 73 determines a femto GW that is a destination of the LA notification. In order to determine the femto GW, the LA notifier 73 references the load state table 72 and identifies the femto GW of which a process load is low. Then, the LA notifier 73 determines, as the destination of the LA notification, the femto GW of which the process load is low. The LA notifier 73 provides the LA notification to the femto GW of which the process load is low, while the LA notifier 73 does not provide the LA notification to a femto GW of which a process load is high. For example, if the load state table is a table illustrated in FIG. 23, the LA notifier 73 provides the LA notification to only the femto GW #1 among the femto GWs #1 to #3.

Example of Configurations of Femto GWs

Figure 24:
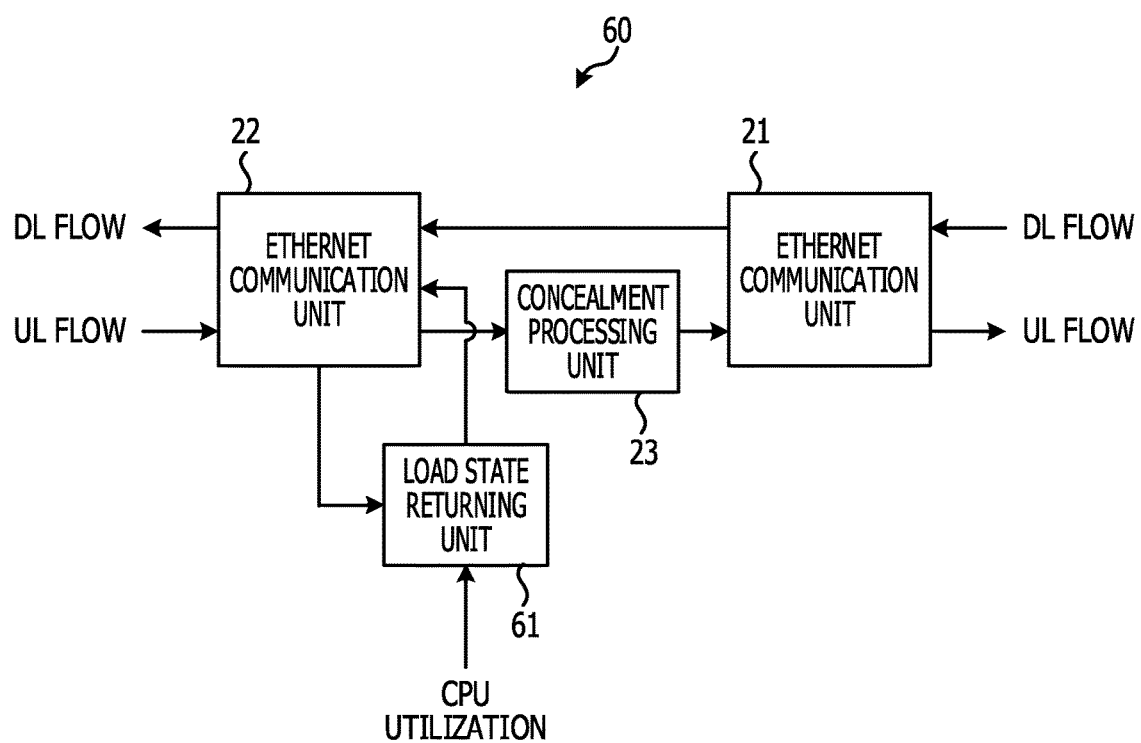
FIG. 24 is a functional block diagram illustrating an example of a femto GW according to the fourth embodiment.

FIG. 24 is a functional block diagram illustrating an example of the femto GWs according to the fourth embodiment. A femto GW 60 illustrated in FIG. 24 corresponds to each of the femto GWs 2-1 to 2-N. The femto GW 60 includes a load state returning unit 61.

An UL flow is input to the load state returning unit 61 from the Ethernet communication unit 22. The UL flow includes an inquiry about a load state. CPU utilization of the femto GW 60 is input to the load state returning unit 61. The load state returning unit 61 determines, based on the inquiry about the load state, whether a current process load of the femto GW 60 is high or low. For example, if the CPU utilization of the femto GW 60 is lower than the threshold, the load state returning unit 61 determines that the process load of the femto GW 60 is low. If the CPU utilization of the femto GW 60 is equal to or higher than the threshold, the load state returning unit 61 determines that the process load of the femto GW 60 is high. Then, the load state returning unit 61 outputs, to the Ethernet communication unit 22, information representing the result of the determination or information representing the load state of the femto GW 60. The Ethernet communication unit 22 transmits, to the femto base station 70, the information representing the load state of the femto GW 60.

Process Sequence of Communication System

Figure 25:
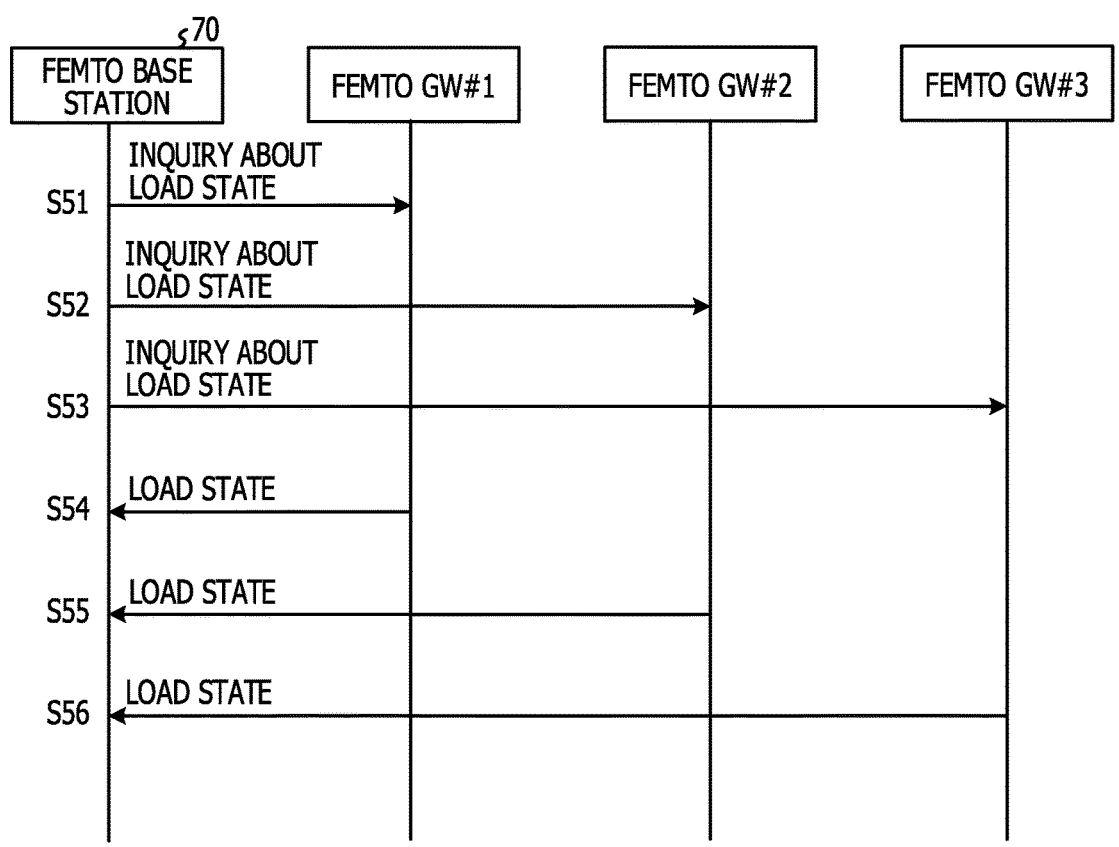
FIG. 25 is a diagram illustrating an example of a process sequence of the communication system according to the fourth embodiment.

FIG. 25 is a diagram illustrating an example of a process sequence of the communication system according to the fourth embodiment. FIG. 25 illustrates a case where the three femto GWs #1 to #3 are connected to the femto base station 70.

In steps S51 to S53 illustrated in FIG. 25, the femto base station 70 sequentially inquires of the femto GWs #1 to #3 about the load states.

In response to the inquiry in step S51, the femto GW #1 transmits the load state of the femto GW #1 (in step S54). For example, the femto GW #1 transmits information that represents that the current load process is low.

In response to the inquiry in step S52, the femto GW #2 transmits the load state of the femto GW #2 (in step S55). For example, the femto GW #2 transmits information that represents that the current load process is high.

In response to the inquiry in step S53, the femto GW #3 transmits the load state of the femto GW #3 (in step S56). For example, the femto GW #3 transmits information that represents that the current load process is high.

Operations of Femto Base Station

Figure 26:
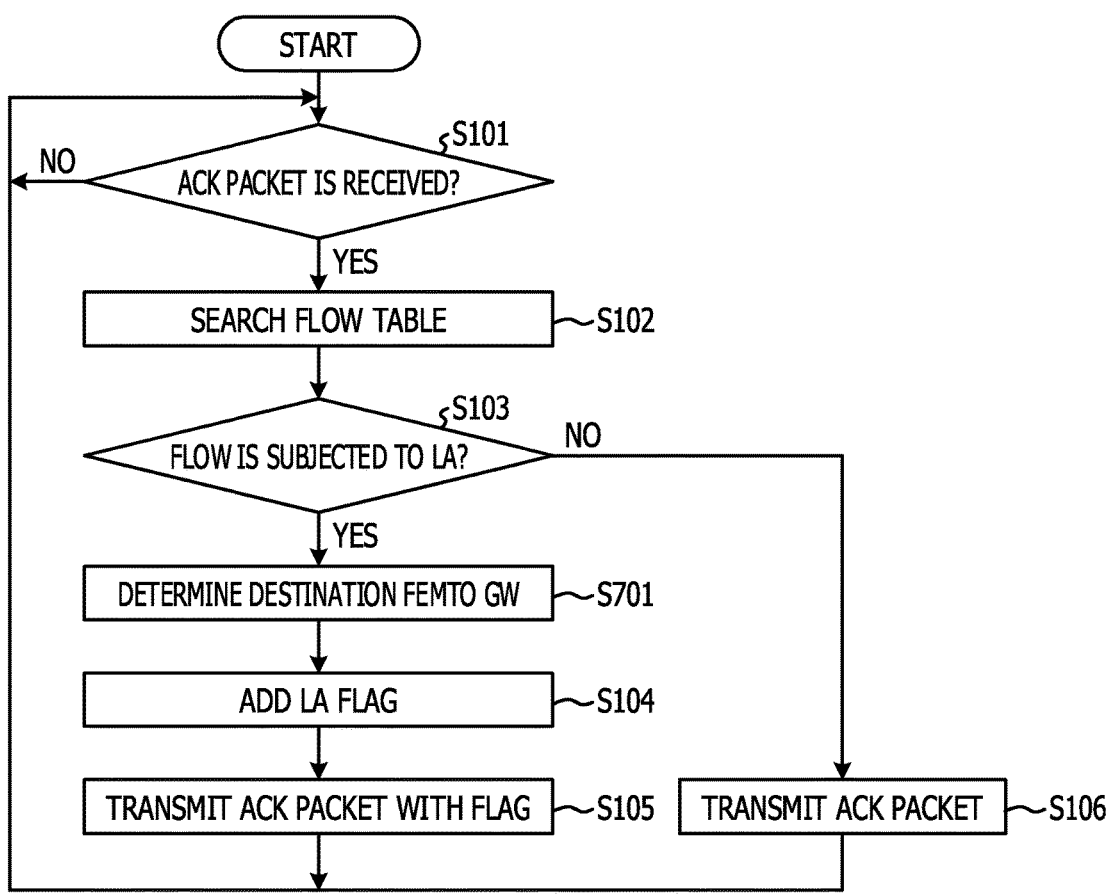
FIG. 26 is a flowchart used to describe operations of the femto base station according to the fourth embodiment.

FIG. 26 is a flowchart used to describe operations of the femto base station according to the fourth embodiment. A process represented by the flowchart of FIG. 26 starts when a power supply of the femto base station 70 is turned on, while the process represented by the flowchart of FIG. 26 is stopped when the power supply of the femto base station 70 is turned off.

If the DL flow is subjected to the LA (Yes in step S103), the femto base station 70 references the load state table 72 and determines a femto GW that is a destination of the LA notification (in step S701).

Then, the femto base station 70 transmits the ACK packet having the LA flag to the femto GW determined to be the destination of the LA notification (in step S105).

As described above, according to the present embodiment, the femto base station 70 provides the LA notification to the femto GW #1 that is among the femto GWs #1 to #3 and of which the process load is lower than the threshold.

Thus, a femto GW of which a process load is low may execute the process of concealing a reversed order, while a femto GW of which a process load is high may not execute the process of concealing a reversed order. Thus, a load of the process of concealing a reversed order may be appropriately distributed between a plurality of femto GWs.

Other Embodiments (1) The aforementioned embodiments describe the example in which a communication method of a first communication link is LTE and a communication method of a second communication link is WiFi. The communication methods of the wireless links that enable the LA are not limited to LTE and WiFi. Besides LTE and WiFi, 3G, Global System for Mobile Communications (GSM (registered trademark)), Universal Mobile Telecommunications System (UMTS), Worldwide Interoperability for Microwave Access (WiMax), and the like may be used as communication methods that enable the LA.

(2) In the aforementioned embodiments, information that represents whether or not a flow is subjected to the LA is provided to a femto GW based on whether or not the flow includes the LA flag. Instead of the LA flag, another flag that has a value "0" or "1" may be provided to a femto GW so as to notify the femto GW whether or not an interested flow is subjected to the LA. In this case, if the other flag has the value "0", the interested flow is not subjected to the LA. If the other flag has the value "1", the interested flow is subjected to the LA. In addition, an ACK packet is transmitted to a specific MAC address of a femto GW or a specific IP address of the femto GW so as to notify the femto GW that an interested flow is subjected to the LA. For example, a plurality of IP addresses may be provided to each of the femto GWs, and if an ACK packet arrives at a specific IP address among a plurality of IP addresses of a femto GW, the femto GW may determine that an interested flow is subjected to the LA.

(3) The aforementioned embodiments describe the case where a femto base station is used as an example of a transmitting device configured to execute the LA on a DL and transmit the DL flow and a communication terminal is used as an example of a receiving device configured to receive the DL flow subjected to the LA. Specifically, the aforementioned embodiments describe the case where the transmitting device and the receiving device are connected to each other by the wireless links as an example. However, the communication links that connect the transmitting device to the receiving device are not limited to the wireless links and may be wired links. If the transmitting device and the receiving device are connected to each other by the plurality of wired links, whether or not the LA is to be executed may be determined based on the amount of traffic of a DL flow in a specific wired link, for example.

(4) In the aforementioned embodiments, the LA may not be executed on a DL flow that is among a plurality of DL flows and for which Quality of Service (QoS) is to be rigorously secured, and only the LTE link may be used for the DL flow, for example. In addition, in the aforementioned embodiments, the LA may be executed on a DL flow that is among the plurality of DL flows and for which QoS is not to be rigorously secured and of which throughput is preferably as high as possible in best-effort communication, and the LTE link and the WiFi link may be used for the DL flow, for example.

(5) The femto base stations according to the aforementioned embodiments may be referred to as "LA devices" configured to execute the LA on a DL flow.

Figure 27:
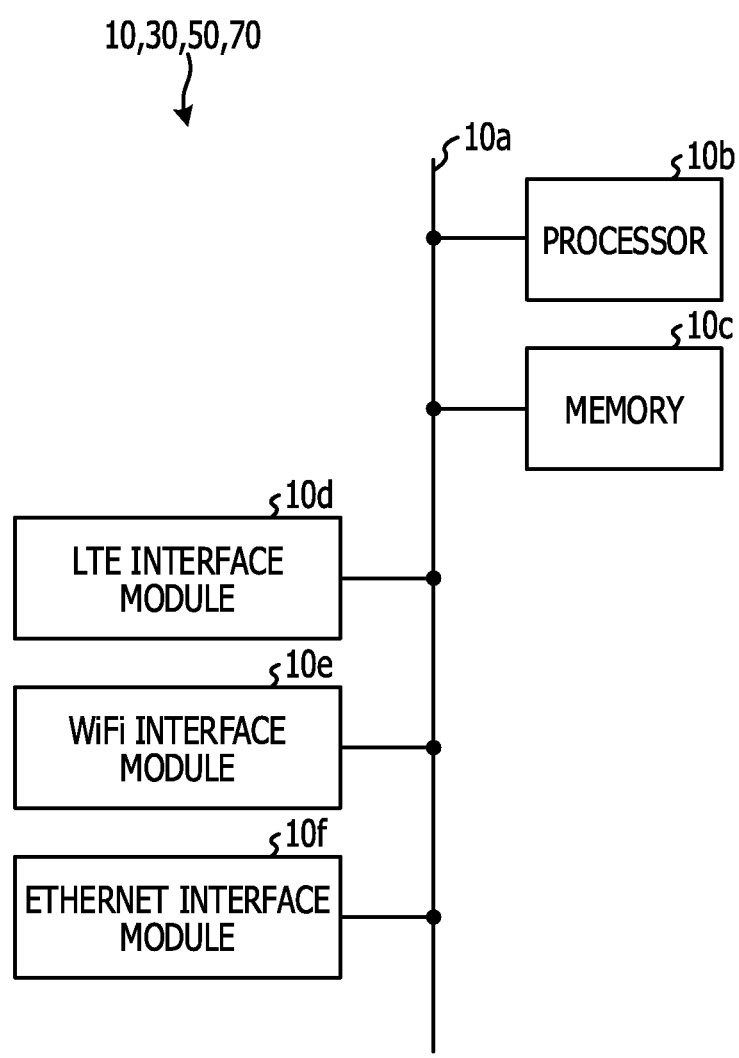
FIG. 27 is a diagram illustrating an example of a hardware configuration of each of the femto base stations.

(6) The femto base stations 10, 30, 50, and 70 according to the aforementioned embodiments may be each achieved by the following hardware configuration. FIG. 27 is a diagram illustrating an example of the hardware configuration of each of the femto base stations. As illustrated in FIG. 27, the femto base stations 10, 30, 50, and 70 each include, as hardware constituent elements, a bus 10a, a processor 10b, a memory 10c, an LTE interface module 10d, a WiFi interface module 10e, and an Ethernet interface module 10f. As an example of the processor 10b, a central processing unit (CPU), a digital signal processor (DSP), a field programmable gate array (FPGA), or the like may be used. In addition, the femto base stations 10, 30, 50, and 70 may each include a large scale integrated (LSI) circuit that includes the processor 10b and a peripheral circuit. As an example of the memory 10c, a RAM such as an SDRAM, a ROM, a flash memory, or the like may be used. The LTE communication unit 13 and the antenna 14 are achieved by the LTE interface module 10d. The WiFi communication unit 15 and the antenna 16 are achieved by the WiFi interface module 10e. The Ethernet communication unit 11 is achieved by the Ethernet interface module 10f. The LA determining units 12 and 51, the LA notifiers 18, 31, 54, and 73, the concealment processing unit 32, and the load state acquirer 71 are achieved by the processor 10b. The flow table 52, the communication table 53, and the load state table 72 are stored in the memory 10c.

(7) The aforementioned processes, which are executed by the LA determining units 12 and 51, the LA notifiers 18, 31, 54, and 73, the concealment processing unit 32, and the load state acquirer 71, may be achieved by causing the processor 10b to execute programs corresponding to the processes. For example, the programs corresponding to the processes to be executed by the LA determining units 12 and 51, the LA notifiers 18, 31, 54, and 73, the concealment processing unit 32, and the load state acquirer 71 may be stored in the memory 10c, read by the processor 10b from the memory 10c, and executed by the processor 10b.

Figure 28:
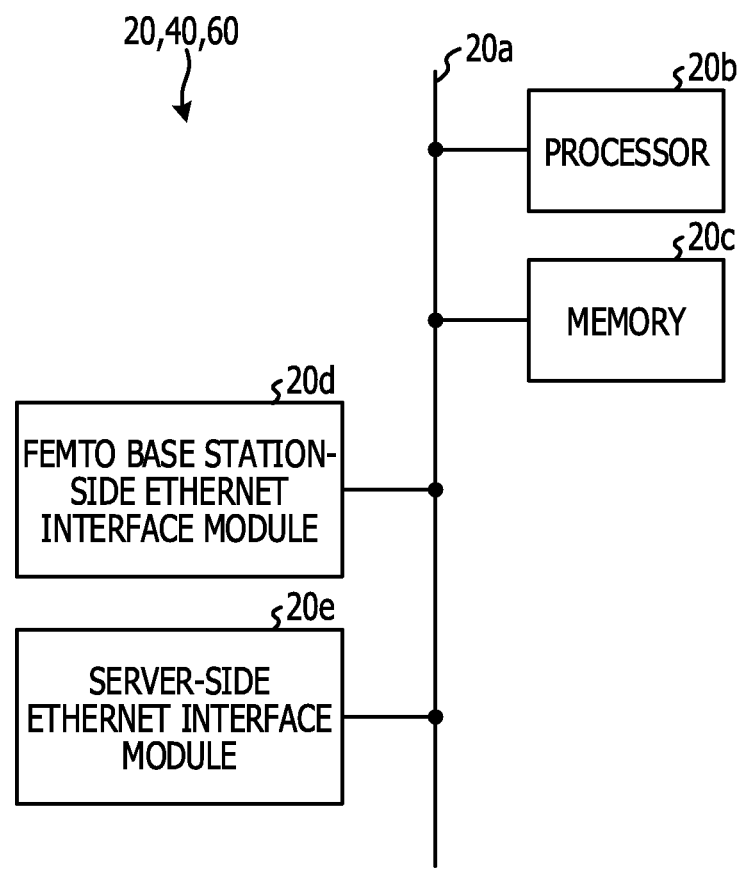
FIG. 28 is a diagram illustrating an example of a hardware configuration of each of the femto GWs.

(8) The femto GWs 20, 40, and 60 according to the aforementioned embodiments may be each achieved by the following hardware configuration. FIG. 28 is a diagram illustrating an example of the hardware configuration of each of the femto GWs. As illustrated in FIG. 28, the femto GWs 20, 40, and 60 each include, as hardware constituent elements, a bus 20a, a processor 20b, a memory 20c, a femto base station-side Ethernet interface module 20d, and a server-side Ethernet interface module 20e. As an example of the processor 20a, a CPU, a DSP, an FPGA, or the like may be used. In addition, the femto GWs 20, 40, and 60 may each include an LSI that includes the processor 20b and a peripheral circuit. As an example of the memory 20c, a RAM such as an SDRAM, a ROM, a flash memory, or the like may be used. The Ethernet communication unit 21 is achieved by the server-side Ethernet interface module 20e. The Ethernet communication unit 22 is achieved by the femto base station-side Ethernet interface module 20d. The concealment processing units 23 and 42, the packet loss determining unit 41, and the load state returning unit 61 are achieved by the processor 20b.

(9) The aforementioned processes, which are executed by the concealment processing units 23 and 42, the packet loss determining unit 41, and the load state returning unit 61, may be achieved by causing the processor 20b to execute programs corresponding to the processes. For example, the programs corresponding to the aforementioned processes to be executed by the concealment processing units 23 and 42, the packet loss determining unit 41, and the load state returning unit 61 may be stored in the memory 20c, read by the processor 20b from the memory 20c, and executed by the processor 20b.

(10) Two or more of the aforementioned first to fourth embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A communication system comprising:
a server including:
  a first memory; and
  a first processor coupled to the first memory;
a relay device including:
  a second memory; and
  a second processor coupled to the second memory;
a transmitting device including:
  a third memory; and
  a third processor coupled to the third memory; and
a receiving device including:
  a fourth memory; and
  a fourth processor coupled to the fourth memory,
    wherein
the first processor is configured to:
  transmit a series of data packets through the relay device and the transmitting device to a receiving device, the fourth processor is configured to:
  transmit a plurality of acknowledgement packets for the data packets through the transmitting device and the relay device to the server,
the third processor is configured to:
  transmit the data packets to the receiving device by using one selected communication link included in a plurality of communication links between the transmitting device and the receiving device or by executing link aggregation, the link aggregation being packet transmission using the plurality of communication links between the transmitting device and the receiving device; and
  transmit to the relay device, when executing the link aggregation, a notification representing that the link aggregation is executed by the transmitting device, and
the second processor is configured to:
  execute a concealment process for one or more specific acknowledgement packets when receiving the notification from the transmitting device, the one or more specific acknowledgement packets being included in the plurality of acknowledgement packets, each of the one or more specific acknowledgment packets representing that an order in which the data packets arrive at the receiving device is different than an order in which the data packets were transmitted by the server, the concealment process including discarding the one or more specific acknowledgement packets and transmitting the acknowledgement packets other than the one or more specific acknowledgement packets to the server, and
  transmit all of the plurality of acknowledgement packets to the server when the notification has not been received from the transmitting device.

2. The communication system according to claim 1, wherein when a process load of the transmitting device is equal to or higher than a threshold, the transmitting device provides the notification to the relay device.

3. The communication system according to claim 1, wherein the transmitting device transmits, to the relay device, communication link information that represents that each of the data packets has been transmitted using any of the communication links, and
wherein when receiving the notification from the transmitting device, the relay device determines, based on the communication link information, whether to execute the concealment process.

4. The communication system according to claim 1, comprising:
a plurality of relay devices,
wherein the transmitting device provides the notification to a specific relay device that is among the plurality of relay devices and of which a process load is lower than a threshold.

5. A transmitting device comprising:
a first communication circuit configured to use a first communication link to communicate with a receiving device;
a second communication circuit configured to use a second communication link to communicate with the receiving device;
a processor coupled to a memory and configured to transmit data packets to the receiving device by using one of the first communication link and the second communication link or by executing link aggregation, the link aggregation being packet transmission using both the first communication link and the second communication link; and
a third communication circuit configured to transmit, to a relay device when executing the link aggregation, a notification representing that the link aggregation is executed by the transmitting device, wherein
the relay device, coupled to the transmitting device, is configured to:
execute a concealment process for one or more specific acknowledgement packets when receiving the notification from the transmitting device, the one or more specific acknowledgement packets being included in a plurality of acknowledgement packets for the data packets, each of the one or more specific acknowledgment packets representing that an order in which the data packets arrive at the receiving device is different than an order in which the data packets were transmitted by a server to the receiving device, the concealment process including discarding the one or more specific acknowledgement packets; and
transmit the acknowledgement packets other than the one or more specific acknowledgement packets to the server when the concealment process is executed and to transmit all of the plurality of acknowledgement packets to the server when the notification has not been received from the transmitting device.

6. A relay device comprising:
a first communication circuit configured to receive, from a transmitting device, a notification that represents that the transmitting device, which is able to use a first communication link and a second communication link to communicate with a receiving device, executes link aggregation to transmit data packets to the receiving device using the first communication link and the second communication link, the transmitting device transmitting data packets to the receiving device by using one of the first communication link and the second communication link or by executing link aggregation, the link aggregation being packet transmission using both the first communication link and the second communication link the transmitting device transmitting the notification to a relay device when executing the link aggregation, the transmitting device transmitting the notification to the relay device when executing the link aggregation;
a processor coupled to a memory and configured to execute a concealment process for one or more specific acknowledgement packets when receiving the notification from the transmitting device, the one or more specific acknowledgement packets being included in a plurality of acknowledgement packets for the data packets, each of the one or more specific acknowledgment packets representing that an order in which the data packets arrive at the receiving device is different than an order in which the data packets were transmitted by a server to the receiving device, the concealment process including discarding the one or more specific acknowledgement packets; and
a second communication circuit configured to transmit the acknowledgement packets other than the one or more specific acknowledgement packets to the server when the concealment process is executed and to transmit all of the plurality of acknowledgement packets to the server when the notification has not been received from the transmitting device.

7. A communication method to be used by a communication system including a server, a relay device, a transmitting device, and a receiving device, comprising:

transmitting, from the server, a series of data packets through the relay device and the transmitting device to the receiving device;

transmitting, from the receiving device, a plurality of acknowledgement packets for the data packets through the transmitting device and the relay device to the server;

transmitting, from the transmitting device to the receiving device, the data packets by using one selected communication link included in a plurality of communication links between the transmitting device and the receiving device or by executing link aggregation, the link aggregation being packet transmission using the plurality of communication links between the transmitting device and the receiving device;

transmitting, from the transmitting device to the relay device when the link aggregation is executed by the transmitting device, a notification representing that the link aggregation has been executed by the transmitting device;

executing, by the relay device, a concealment process for one or more specific acknowledgement packets when receiving the notification from the transmitting device, the one or more specific acknowledgement packets being included in the plurality of acknowledgement packets, each of the one or more specific acknowledgment packets representing that an order in which the data packets arrive at the receiving device is different than an order in which the data packets were transmitted by the server, the concealment process including discarding the one or more specific acknowledgement packets;

transmitting, from the relay device to the server, the acknowledgement packets other than the one or more specific acknowledgement packets when the concealment process is executed by the relay device; and transmitting all of the plurality of acknowledgement packets to the server when the notification has not been received from the transmitting device.

8. The communication system according to claim 1, wherein the third processor is configured to:

decide whether the transmitting device executes link aggregation or not based on the usage of at least one of the plurality of communication links.

* * * * *